(12) United States Patent
Guim Bernat et al.

(10) Patent No.: US 11,768,705 B2
(45) Date of Patent: *Sep. 26, 2023

(54) AUTOMATIC LOCALIZATION OF ACCELERATION IN EDGE COMPUTING ENVIRONMENTS

(71) Applicant: Intel Corporation, Santa Clara, CA (US)

(72) Inventors: Francesc Guim Bernat, Barcelona (ES); Karthik Kumar, Chandler, AZ (US); Ned M. Smith, Beaverton, OR (US); Thomas Willhalm, Sandhausen (DE); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/504,062

(22) Filed: Oct. 18, 2021

(65) Prior Publication Data

US 2022/0138003 A1    May 5, 2022

Related U.S. Application Data

(63) Continuation of application No. 16/586,576, filed on Sep. 27, 2019, now Pat. No. 11,157,311.

(Continued)

(51) Int. Cl.
*G06F 9/50* (2006.01)
*G06F 9/48* (2006.01)
(Continued)

(52) U.S. Cl.
CPC ............ *G06F 9/5005* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/45562;
(Continued)

(56) References Cited

U.S. PATENT DOCUMENTS 10,198,294 B2   2/2019   Chiou et al.
11,157,311 B2   10/2021  Guim Bernat et al.
(Continued)

FOREIGN PATENT DOCUMENTS

CN          111953725 A          11/2020

OTHER PUBLICATIONS

Jiang et al, "Accelerating Mobile Applications at the Network Edge with Software-Programmable FPGAs", IEEE INFOCOM 2018—IEEE Conference on Computer Communications, Apr. 16-19, 2018, pp. 55-62 (Year: 2018).*

(Continued)

*Primary Examiner* — Charles M Swift
(74) *Attorney, Agent, or Firm* — Schwegman Lundberg & Woessner, P.A.

(57) ABSTRACT

Methods, apparatus, systems and machine-readable storage media of an edge computing device which is enabled to access and select the use of local or remote acceleration resources for edge computing processing is disclosed. In an example, an edge computing device obtains first telemetry information that indicates availability of local acceleration circuitry to execute a function, and obtains second telemetry that indicates availability of a remote acceleration function to execute the function. An estimated time (and cost or other identifiable or estimateable considerations) to execute the function at the respective location is identified. The use of the local acceleration circuitry or the remote acceleration resource is selected based on the estimated time and other appropriate factors in relation to a service level agreement.

24 Claims, 11 Drawing Sheets

Related U.S. Application Data

(60) Provisional application No. 62/841,042, filed on Apr. 30, 2019.

(51) Int. Cl.

| | | |
|---|---|---|
| G06F 9/455 | (2018.01) | |
| G06F 16/23 | (2019.01) | |
| H04L 9/06 | (2006.01) | |
| G06F 16/27 | (2019.01) | |
| H04L 9/32 | (2006.01) | |
| H04L 41/12 | (2022.01) | |
| H04L 47/70 | (2022.01) | |
| G06F 21/60 | (2013.01) | |
| H04L 9/08 | (2006.01) | |
| G06F 21/62 | (2013.01) | |
| H04L 67/52 | (2022.01) | |
| H04L 67/60 | (2022.01) | |
| G06F 11/30 | (2006.01) | |
| H04L 12/66 | (2006.01) | |
| H04L 9/00 | (2022.01) | |

(52) U.S. Cl.
CPC ............ *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4862* (2013.01); *G06F 9/4881* (2013.01); *G06F 9/4893* (2013.01); *G06F 9/50* (2013.01); *G06F 9/505* (2013.01); *G06F 9/5011* (2013.01); *G06F 9/5027* (2013.01); *G06F 9/5033* (2013.01); *G06F 9/5044* (2013.01); *G06F 9/5061* (2013.01); *G06F 9/5072* (2013.01); *G06F 9/5077* (2013.01); *G06F 9/5083* (2013.01); *G06F 9/5088* (2013.01); *G06F 9/5094* (2013.01); *G06F 11/30* (2013.01); *G06F 16/2365* (2019.01); *G06F 16/27* (2019.01); *G06F 21/602* (2013.01); *G06F 21/62* (2013.01); *H04L 9/0637* (2013.01); *H04L 9/0827* (2013.01); *H04L 9/3247* (2013.01); *H04L 12/66* (2013.01); *H04L 41/12* (2013.01); *H04L 47/82* (2013.01); *H04L 67/52* (2022.05); *H04L 67/60* (2022.05); *G06F 2009/4557* (2013.01); *G06F 2009/45562* (2013.01); *H04L 9/50* (2022.05)

(58) Field of Classification Search
CPC .. G06F 2009/4557; G06F 9/48; G06F 9/4806; G06F 9/4843; G06F 9/485; G06F 9/4856; G06F 9/4881; G06F 11/30; G06F 9/50; G06F 9/5005; G06F 9/5044; G06F 9/505; G06F 9/5061; G06F 9/5072; G06F 9/5077; G06F 9/5083; G06F 9/5094
See application file for complete search history.

(56) References Cited

U.S. PATENT DOCUMENTS

| | | | |
|---|---|---|---|
| 2011/0010721 A1 | 1/2011 | Gupta et al. | |
| 2011/0106916 A1 | 5/2011 | Cho et al. | |
| 2011/0131580 A1 | 6/2011 | Krishnamurthy et al. | |
| 2013/0305028 A1* | 11/2013 | Mo | G06F 12/1466 713/193 |
| 2014/0237477 A1* | 8/2014 | Cadambi | G06F 9/5044 718/103 |
| 2017/0353397 A1 | 12/2017 | Che | |
| 2018/0024861 A1 | 1/2018 | Balle et al. | |
| 2018/0246768 A1 | 8/2018 | Palermo et al. | |
| 2018/0287894 A1 | 10/2018 | Senarath | |
| 2019/0026150 A1 | 1/2019 | Shimamura et al. | |
| 2019/0044886 A1 | 2/2019 | Bernat et al. | |
| 2019/0138361 A1 | 5/2019 | Bernat et al. | |
| 2019/0171483 A1* | 6/2019 | Santhar | G06F 9/4881 |
| 2020/0026575 A1 | 1/2020 | Guim Bernat et al. | |

OTHER PUBLICATIONS

"U.S. Appl. No. 16/586,576, Non Final Office Action dated Mar. 3, 2021", 15 pgs.

"U.S. Appl. No. 16/586,576, Notice of Allowance dated Jun. 29, 2021", 9 pgs.

"U.S. Appl. No. 16/586,576, Response filed May 28, 2021 to Non Final Office Action dated Mar. 3, 2021", 14 pgs.

"European Application Serial No. 20155735.2, Communication Pursuant to Article 94(3) EPC dated Feb. 11, 2021", 4 pgs.

"European Application Serial No. 20155735.2, Extended European Search Report dated Jul. 24, 2020", 10 pgs.

"European Application Serial No. 20155735.2, Response filed Jan. 18, 2021 to Extended European Search Report dated Jul. 24, 2020", 13 pgs.

"European Application Serial No. 20155735.2, Response filed Jun. 21, 2021 to Communication Pursuant to Article 94(3) EPC dated Feb. 11, 2021", 18 pgs.

Ashkan, Yousefpour, et al., "All One Needs to Know about Fog Computing and Related Edge Computing Paradigms: A Complete Survey", Arxiv.org, Cornell University Library, 201 Olin Library Cornell University Ithaca, NY 14853, (Aug. 15, 2018), XP081257480, (Aug. 15, 2018), 1-31.

Brown, Gabriel, "All One Needs to Know about Fog Computing and Related Edge Provider Networks", A Heavy Reading white paper produced for Advantech Co. Ltd., (Feb. 2017), 10 pgs.

Mahir, Kaya, "An Optimal Application Partitioning and Computational Offloading Framework for Mobile Cloud Computing", (Jan. 2016), 131 pgs.

Sengupta, Dipanjan, et al., "Scheduling Multi-tenant Cloud Workloads on Accelerator-Based Systems", International Conference for High Performance Computing, Networking, Storage and Analysis, IEEE, (Nov. 16, 2014), 513-524.

Zhao, Yangming, et al., "Job Scheduling for Acceleration Systems in Cloud Computing", IEEE International Conference on Communications (ICC), (May 20, 2018), 1-6.

"European Application Serial No. 20155735.2, Summons to attend oral proceedings mailed Feb. 28, 2022", 11 pgs.

Liqing, Liu, "Multi-objective optimization for computation offloading in mobile-edge computing", IEEE Symposium on Computers and Communications (ISCC), (Jul. 3, 2017), 832-837.

Messous, Mohamed-Ayoub, "Computation offloading game for an UAV network in mobile edge computing", IEEE International Conference on Communications (ICC), IEEE, (May 21, 2017), 1-6.

Tayade, Shreya, "Delay Constrained Energy Optimization for Edge Cloud Offloading", IEEE International Conference on Communications Workshops (ICC Workshops), IEEE, (May 20, 2018), 1-6.

Wang, Jianyu, "Edge Cloud Offloading Algorithms", ACM Computing Surveys, ACM, New York, NY, US, US, vol. 52, No. 1, (Feb. 13, 2019), 1-23.

Zhu, Qiliang, "Task offloading decision in fog computing system", China Communications, China Institute of Communications, Piscataway, NJ, USA, vol. 14, No. 11, (Nov. 1, 2017), 59-68.

"European Application Serial No. 20155735.2, EPO Written Decision to Refuse dated Jan. 20, 2023", 18 pgs.

"European Application Serial No. 20155735.2, Response filed Nov. 8, 2022 to Summons to attend oral proceedings mailed Feb. 28, 2022", 24 pgs.

* cited by examiner

AUTOMATIC LOCALIZATION OF ACCELERATION IN EDGE COMPUTING ENVIRONMENTS

This application is a continuation of U.S. patent application Ser. No. 16/586,576, filed Sep. 27, 2019, which claims the benefit of priority to U.S. Provisional Application Ser. No. 62/841,042, filed Apr. 30, 2019, all of which are incorporated herein by reference in their entirety.

TECHNICAL FIELD

Embodiments described herein generally relate to edge computing and related distributed computing environments, and in particular, to the management and usage of acceleration resources operable at edge computing platforms.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations with orchestration, functional coordination, and resource management, especially in complex mobility settings where many participants (devices, hosts, tenants, service providers, operators) are involved.

Acceleration technologies are expected to play a significant role in the development and use of edge computing deployments. Previous forms of function-specific acceleration on a user's smartphone, laptop, or local server were developed, in part, to offset network latency challenges associated with cloud-based acceleration and offload solutions. However, edge computing promises a better acceleration offload experience due to the lower latency networking infrastructure based on existing 4G and emerging 5G technology.

Accelerated offload to a lower latency, high-performance edge cloud environment is unlikely to be successful unless such use cases are more robust and integrated than the types of acceleration offered by client-cloud solutions. The use of acceleration in the edge cloud introduces power, form factor, HW and SW real-estate considerations that have not been considered in client/cloud or other all-or-nothing deployments. As a result, the use of acceleration in edge computing systems has not been widely adopted.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for evaluating and implementing acceleration within an edge computing system. In an example, a lightweight version of an acceleration evaluation framework is implemented on a client endpoint device to identify and coordinate the location of accelerated edge computing operations. This acceleration evaluation framework includes edge orchestration controls so that local accelerated functions (if available locally) can be used within operational parameters of a service level agreement (SLA) or similar service level objective (SLO) (e.g., power, cost, performance, security parameters). This acceleration evaluation framework also includes controls so that remote accelerated functions may be invoked based on the unavailability of the local accelerated functions, based on timing, based on SLA considerations, or the like.

The present techniques support a variety of edge computing installations by performing an intelligent context switch between local and remote execution. The present techniques enable edge orchestrators to exercise greater flexibility in achieving the most ideal tradeoff for executing the accelerated edge workload locally or remotely, while considering many aspects of timing, resources, and usability.

Existing acceleration solutions often do not offer a suitable consideration for cost, performance, design, or user experience. Cloud-based acceleration, likewise, is often not sufficiently integrated with end use cases to ensure a proper user experience. Further, the latency experienced with cloud-based acceleration is not acceptable for use cases such as augmented/virtual reality (AR/VR), vehicle operations, and certain collaboration use cases. In contrast, local acceleration may have low latency but is costly, impacts battery life, and has industrial design issues that affect usability and user desirability. These issues are addressed through a coordinated use of local and edge acceleration resources.

The following systems and techniques may be implemented in, or augment, a variety of distributed, virtualized, or managed edge computing systems. These include environments in which network services are implemented or managed using multi-access edge computing (MEC) or 4G/5G wireless network configurations; or in wired network configurations involving fiber, copper, and other connections. Further, aspects of processing by the respective computing components may involve any computational element which is in sufficient geographical proximity of a user equipment, including a smartphone, vehicular communication component, etc.

Figure 1:
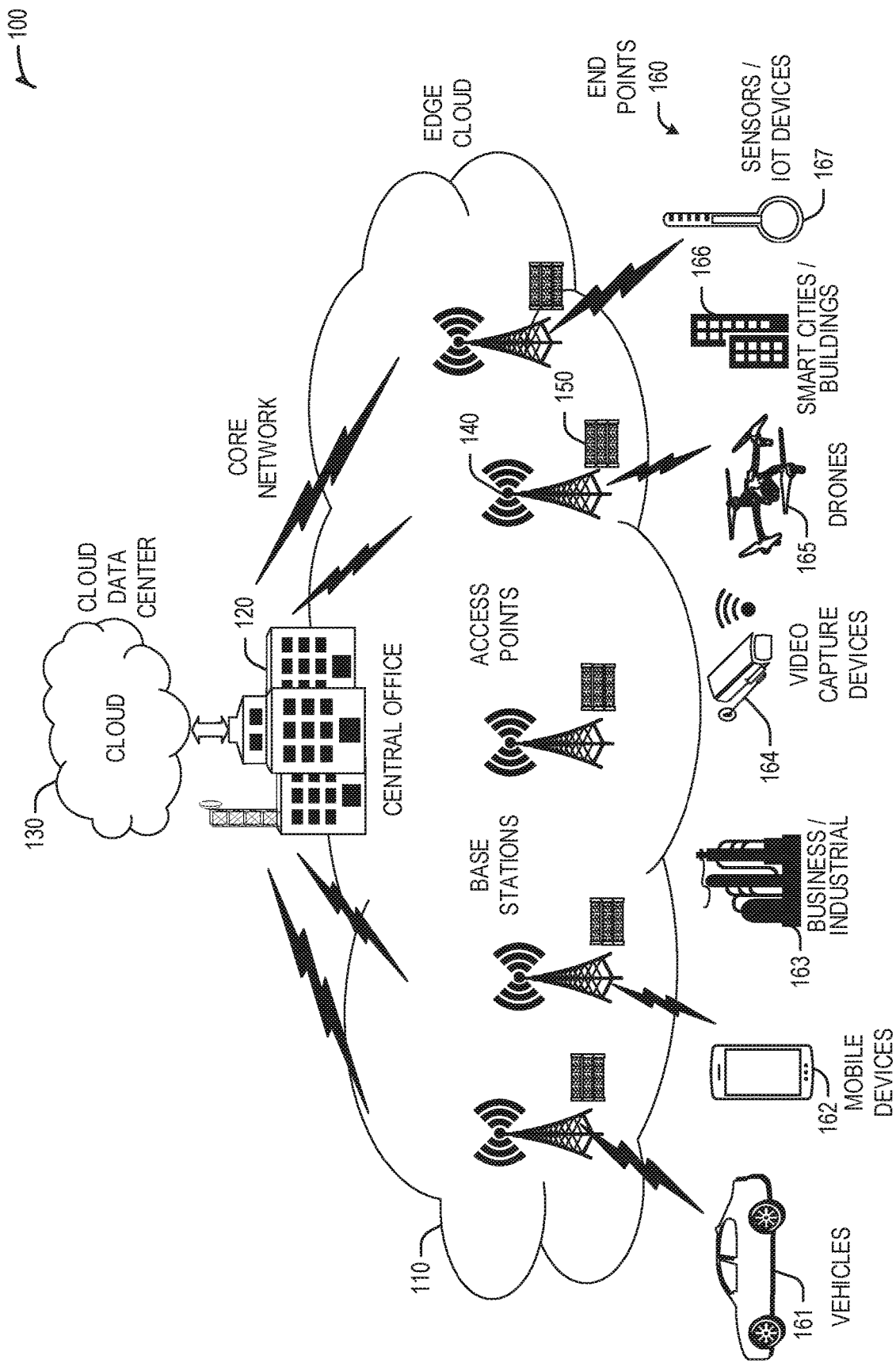
FIG. 1 illustrates an overview of an edge cloud configuration for edge computing, according to an example.

FIG. 1 is a block diagram 100 showing an overview of a configuration for edge computing, which includes a layer of processing referenced in many of the following examples as an "edge cloud". As shown, the edge cloud 110 is co-located at an edge location, such as the base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 163, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. These and other scenarios may involve the use of coordinated acceleration, as provided in the discussion below.

Figure 2:
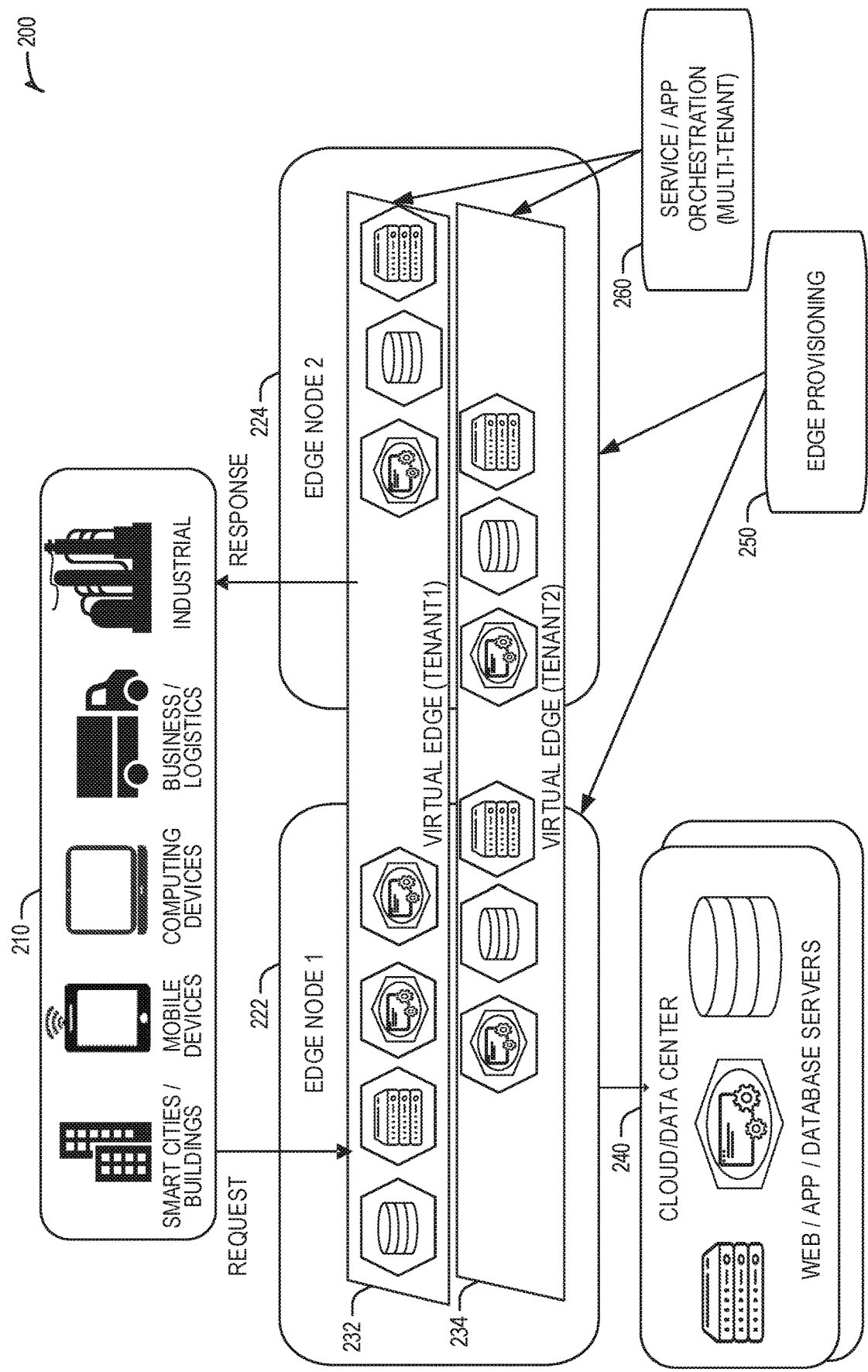
FIG. 2 illustrates deployment and orchestration for virtual edge configurations across an edge computing system operated among multiple edge nodes and multiple tenants, according to an example.

FIG. 2 illustrates deployment and orchestration for virtual edge configurations across an edge computing system operated among multiple edge nodes and multiple tenants. Specifically, FIG. 2 depicts coordination of a first edge node 222 and a second edge node 224 in an edge computing system 200, to fulfill requests and responses for various client endpoints 210 from various virtual edge instances. The virtual edge instances provide edge compute capabilities and processing in an edge cloud, with access to a cloud/data center 240 for higher-latency requests for websites, applications, database servers, etc. Thus, the edge cloud enables coordination of processing among multiple edge nodes for multiple tenants or entities.

In the example of FIG. 2, these virtual edge instances include: a first virtual edge 232, offered to a first tenant (Tenant 1), which offers a first combination of edge storage, computing, and services; and a second virtual edge 234, offering a second combination of edge storage, computing, and services. The virtual edge instances 232, 234 are distributed among the edge nodes 222, 224, and may include scenarios in which a request and response are fulfilled from the same or different edge nodes. The configuration of each edge node 222, 224 to operate in a distributed yet coordinated fashion occurs based on edge provisioning functions 250. The functionality of the edge nodes 222, 224 to provide coordinated operation for applications and services, among multiple tenants, occurs based on orchestration functions 260.

It should be understood that some of the devices in 210 are multi-tenant devices where Tenant1 may function within a Tenant1 'slice' while a Tenant2 may function within a Tenant2 slice. A trusted multi-tenant device may further contain a tenant specific cryptographic key such that the combination of key and slice may be considered a "root of trust" (RoT) or tenant-specific RoT. A RoT may further be computed dynamically composed using a security architecture, such as a DICE (Device Identity Composition Engine) architecture where a DICE hardware building block is used to construct layered trusted computing base contexts for layering of device capabilities (such as a Field Programmable Gate Array (FPGA)). The RoT also may be used for a trusted computing context to support respective tenant operations, etc.

Edge computing nodes may partition resources (memory, CPU, GPU, interrupt controller, IO controller, memory controller, bus controller, etc.) where each partition may contain a RoT capability and where fan-out and layering according to a DICE model may further be applied to edge nodes. Cloud computing nodes consisting of containers, FaaS (function as a service) engines, servlets, servers, or other computation abstraction may be partitioned according to a DICE layering and fan-out structure to support a RoT context for each. Accordingly, the respective RoTs spanning devices 210, 222, and 240 may coordinate the establishment of a distributed trusted computing base (DTCB) such that a tenant-specific virtual trusted secure channel linking all elements end-to-end can be established.

Additionally, the edge computing system may be extended to provide for orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 2. An orchestrator may use a DICE layering and fan-out construction to create a root of trust context that is tenant-specific. Thus, orchestration functions, provided by an orchestrator, may participate as a tenant-specific orchestration provider.

Accordingly, an edge computing system may be configured to fulfill requests and responses for various client endpoints from multiple virtual edge instances (and, from a cloud or remote data center, not shown). The use of these virtual edge instances supports multiple tenants and multiple applications (e.g., AR/VR, enterprise applications, content delivery, gaming, compute offload) simultaneously. Further, there may be multiple types of applications within the virtual edge instances (e.g., normal applications, latency sensitive applications, latency critical applications, user plane applications, networking applications, etc.). The virtual edge instances may also be spanned across systems of multiple owners at different geographic locations.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to each tenant (aside the execution of virtualized network functions).

Within the edge cloud, a first edge node 222 (e.g., operated by a first owner) and a second edge node 224 (e.g., operated by a second owner) also may operate or respond to a container orchestrator to coordinate the execution of various applications within the virtual edge instances offered for respective tenants. For instance, the edge nodes 222, 224 may be coordinated based on edge provisioning functions 250, while the operation of the various applications are coordinated with orchestration functions 260.

Various system arrangements may provide an architecture that treats VMs, Containers, and Functions equally in terms of application composition (and resulting applications are combinations of these three ingredients). Each ingredient may involve use of one or more accelerator (e.g., FPGA, ASIC) components as a local backend. In this manner, applications can be split across multiple edge owners, coordinated by an orchestrator.

Figure 3:
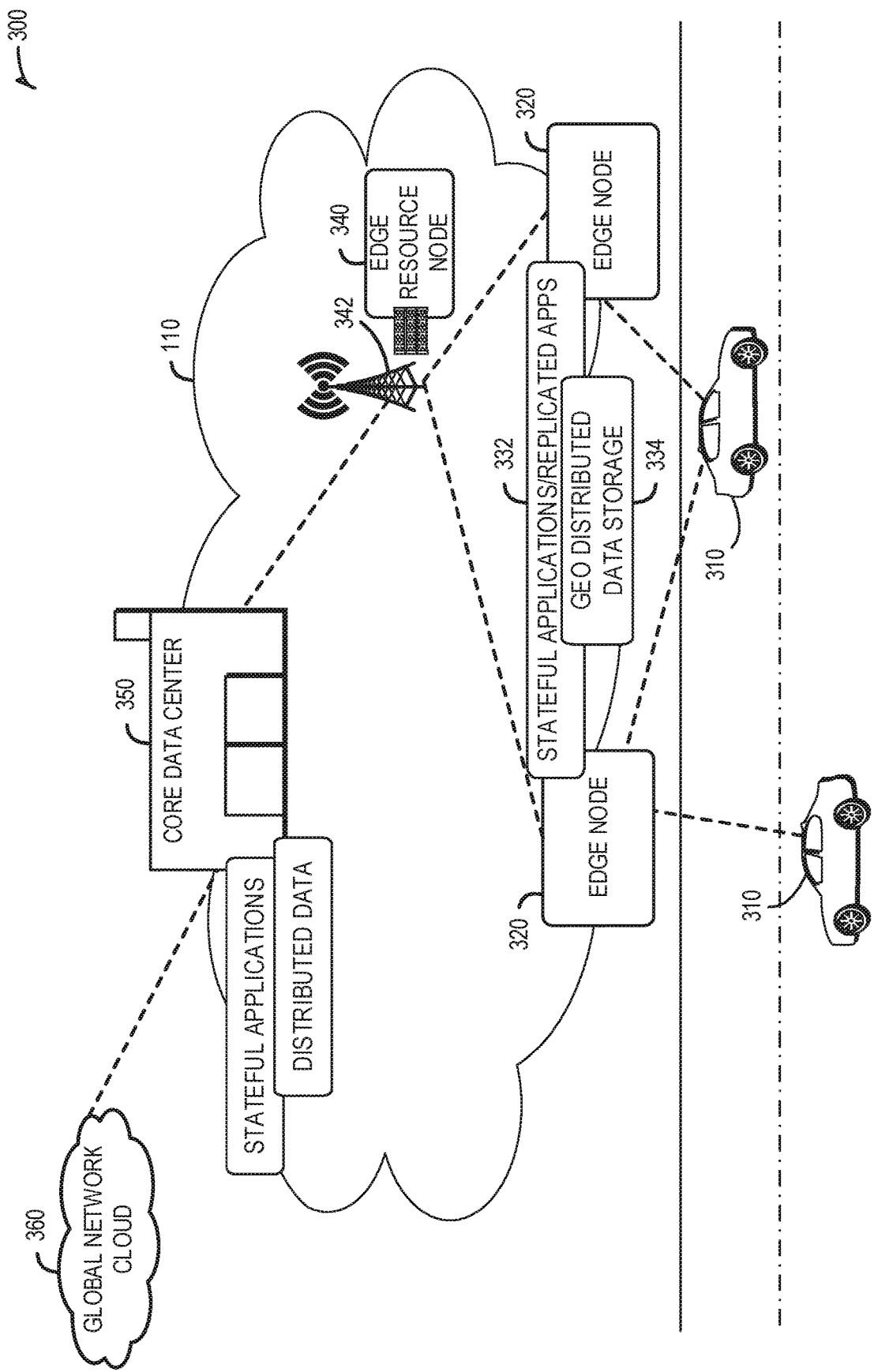
FIG. 3 illustrates a vehicle compute and communication use case involving mobile access to applications in an edge computing system, according to an example.

It should be appreciated that the edge computing systems and arrangements discussed herein may be applicable in various solutions, services, and/or use cases. As an example, FIG. 3 shows a simplified vehicle compute and communication use case involving mobile access to applications in an edge computing system 300 that implements an edge cloud 110. In this use case, each client compute node 310 may be embodied as in-vehicle compute systems (e.g., in-vehicle navigation and/or infotainment systems) located in corresponding vehicles that communicate with the edge gateway nodes 320 during traversal of a roadway. For instance, each of the edge gateway nodes 320 may be located in a roadside cabinet, which may be placed along the roadway, at intersections of the roadway, or other locations near the roadway. As each vehicle traverses along the roadway, the connection between its client compute node 310 and a particular edge gateway nodes 320 may propagate so as to maintain a consistent connection and context for the client compute node 310. Each of the edge gateway nodes 320 includes an amount of processing and storage capabilities and, as such, some processing and/or storage of data for the client compute nodes 310 may be performed on one or more of the edge gateway nodes 320.

Each of the edge gateway nodes 320 may communicate with one or more edge resource nodes 340, which are illustratively embodied as compute servers, appliances or components located at or in a communication base station 342 (e.g., a based station of a cellular network). As discussed above, each edge resource node 340 includes an amount of processing and storage capabilities and, as such, some processing and/or storage of data for the client compute nodes 310 may be performed on the edge resource node 340. For example, the processing of data that is less urgent or important may be performed by the edge resource node 340, while the processing of data that is of a higher urgency or importance may be performed by edge gateway devices or the client nodes themselves (depending on, for example, the capabilities of each component).

The edge resource node(s) 340 also communicate with the core data center 350, which may include compute servers, appliances, and/or other components located in a central location (e.g., a central office of a cellular communication network). The core data center 350 may provide a gateway to the global network cloud 360 (e.g., the Internet) for the edge cloud 110 operations formed by the edge resource node(s) 340 and the edge gateway nodes 320. Additionally, in some examples, the core data center 350 may include an amount of processing and storage capabilities and, as such, some processing and/or storage of data for the client compute devices may be performed on the core data center 350 (e.g., processing of low urgency or importance, or high complexity). The edge gateway nodes 320 or the edge resource nodes 340 may offer the use of stateful applications 332 and a geographic distributed data storage 334 (e.g., database, data store, etc.).

In further examples, FIG. 3 may utilize various types of mobile edge nodes, such as an edge node hosted in a vehicle (e.g., car, truck, tram, train, etc.) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 320, some others at the edge resource node 340, and others in the core data center 350 or global network cloud 360.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including a support of respective functions that support edge computing as a service. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Figure 4:
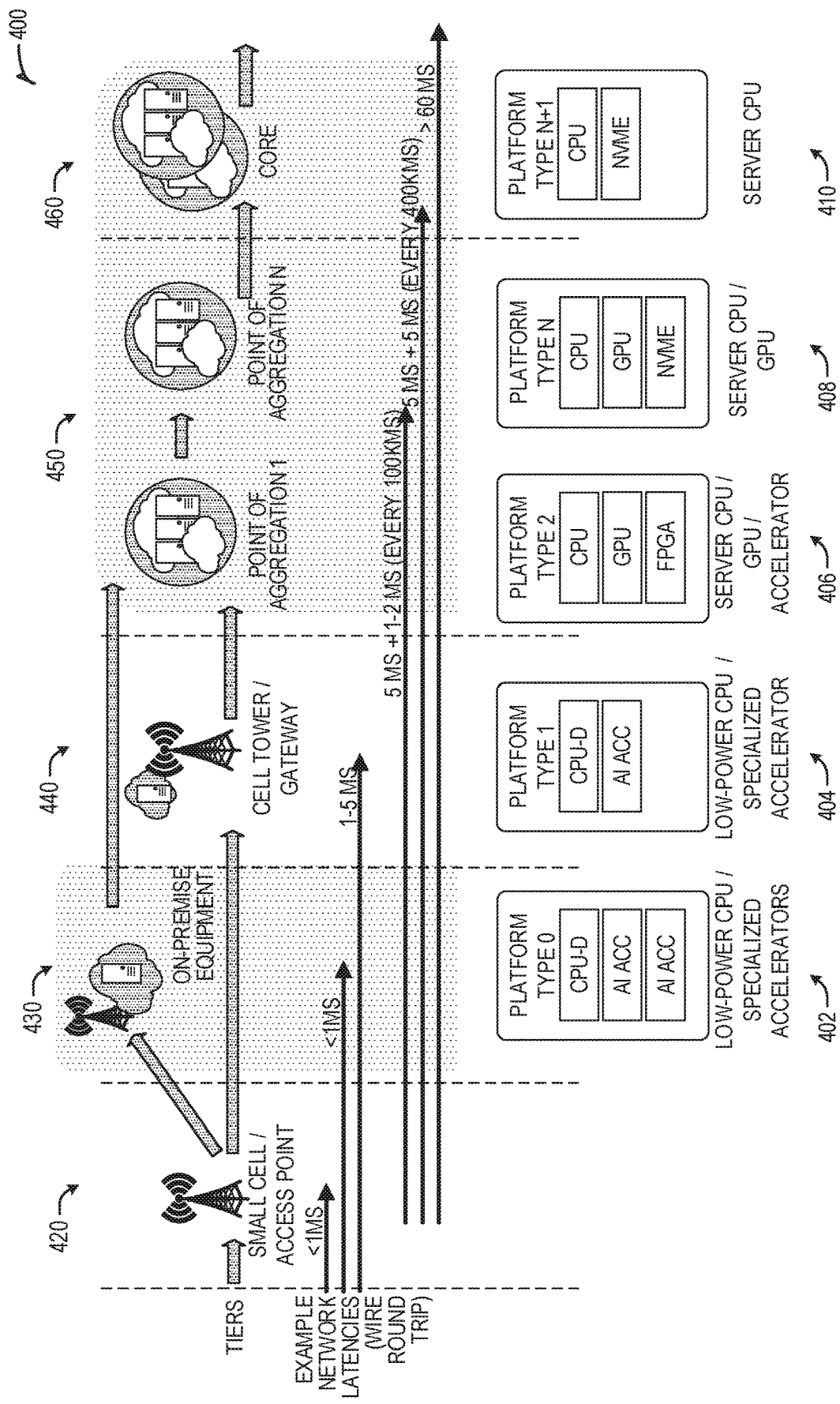
FIG. 4 illustrates further mapping of edge computing hardware configurations to operational deployments and latencies in network layers, according to an example.

FIG. 4 illustrates a further mapping of edge computing hardware configurations to operational deployments and latencies in network layers, based on a mapping of hardware platforms 402-408 to various layers 420-460 of the edge cloud and beyond (extending the operational network layer examples discussed above for FIG. 4). For instance, at layer 430, a combination of low-powered CPUs with multiple specialized accelerators (hardware 402) may provide a first platform type suitable for execution of on-premise services or edgelets (e.g., requiring extremely low latency, under a millisecond). At layer 440, a similar combination of low-powered CPUs with a specialized accelerator (hardware 402) may provide a second platform type suitable for low-power execution of services for multiple types of devices (e.g., requiring low latency under 5 ms). Deeper into the network, a combination of server-class CPUs with specialized GPUs and accelerators (hardware 406) or storage (hardware 408) may be provided at the aggregation layer 450. Finally, beyond the edge cloud, multi-core server CPUs and storage (hardware 410) may be provided at the core network layer 460 to enable the availability of server-class (cloud) processing but with the tradeoff of higher latencies.

The system 400 may provide operation of a service for multiple tenants among multiple layers of edge computing hardware configurations in an edge computing system 400. At each of the various operational layers (e.g., corresponding to layers 420-470) of the edge computing system 400, different combinations of hardware availability and platform features are exposed. For instance, a small cell operating at a local layer 420 may have limited hardware (e.g., low-power CPUs) with limited or no specialized platform features (software or hardware features). An on-premise machine operating at the on-premise layer 430 may host additional or more powerful hardware and offer software or hardware features (e.g., AI accelerators, FPGAs, cryptography services, etc.). The base station layer 440 may have even more hardware capabilities (e.g., high-powered CPUs) or more advanced platform features (advanced storage memory); more advanced combinations of hardware and platform features (including smart networking components) may be provided at the aggregation layer 450 and the core network layer 460.

Figure 5:
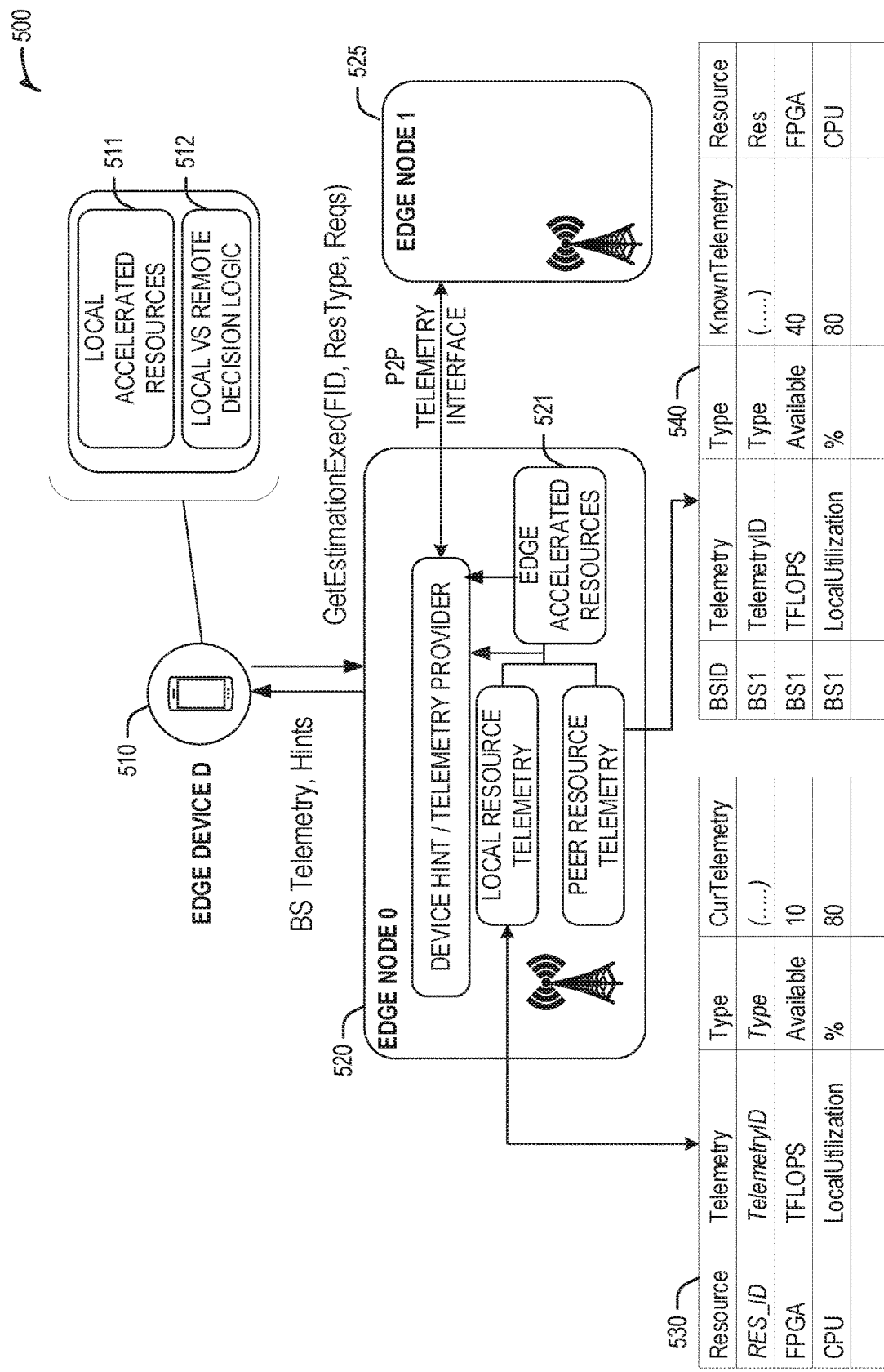
FIG. 5 illustrates a configuration of an edge computing deployment, adapted for exchanging and utilizing telemetry information for execution and acceleration management, according to an example.

FIG. 5 illustrates a configuration 500 of an edge computing deployment, adapted for exchanging and utilizing telemetry information of execution and acceleration management in local or edge settings. FIG. 5 more specifically depicts the arrangement of an edge orchestration framework that accesses and evaluates local acceleration resources, as operating at an endpoint device (e.g., "local" edge device D 510), and edge acceleration resources, as operating at a device or node located in the edge cloud (e.g., an "edge offload platform" provided by an edge node 0 520 or edge node 1 525, such as provided by respective base stations or access points).

The available acceleration framework may coordinate use of different types of acceleration offload platforms and components, considering the acceleration resources at the local device (local accelerated resources 511), or acceleration resources which are invoked from an offload from the local device to the first base station (edge node 0 520) or the second base station (edge node 1 525), or other/multiple resources. In further examples, the acceleration offload platform may be another end point, base station, access point, on-premise server, regional hosting center, or even core network data center. Function acceleration engines may be deployed at these and other edge locations, which are discoverable or addressable after the respective platforms register an acceleration profile with orchestration providers or edge discovery nodes.

Edge acceleration-aware orchestrators (not shown in FIG. 5) may work with this acceleration framework to manage the registration and discovery of local and edge-cloud-based acceleration resources. Acceleration resources, for instance, may maintain or be associated with a profile of key power/performance indicators (KPIs). The profile also may track attestation properties describing the security protections offered. The attestation properties may indicate properties to be attested to, such as for example: an identity; root of trust hardware; firmware/software configuration and status (e.g., for known vulnerabilities); trusted execution environment availability; strength-of-function; end-to-end data protection profiles and strength-of-function; and location information (geographic and proximity). Further, each of these properties may be attested to and represented by attestation results.

The acceleration framework may be built into features of the hardware accelerators or hosting device, so that if the accelerators are available on the device, they can efficiently report current acceleration profile status. This allows localized decision-making related to offloaded workloads—specifically, whether to schedule locally or which edge resource to target for remote offload acceleration.

The acceleration framework may also define interfaces, compiler hooks, libraries, and bitstreams that are commonly applied to accelerate specific functions. For instance, when the application executes a data acceleration function (which could be implemented in the acceleration device using a field programmable gate array (FPGA), artificial intelligence (AI) processor, graphics processing unit (GPU), a central processing unit (CPU), etc.), then the hardware participates in accelerated collection of accelerator telemetry data. The available accelerators report telemetry features, such as network/connection latency, acceleration performance benchmarks, power/battery cost, and other costs and context useful to SLA/SLO optimization to meet the KPIs.

The acceleration framework, in more detail, evaluates telemetry at the endpoint device (e.g., edge device D 510, such as a mobile device user equipment (UE)) related to local and remote acceleration features. Local telemetry features (e.g., associated with the local accelerated resources 511) may indicate the local acceleration capabilities, performance, power/battery, latency, and computational profile/benchmarks. Edge telemetry features (e.g., associated with the edge accelerated resources 521 of an edge computing resource) may indicate these values in addition to hints and features. For instance, as shown in FIG. 5, an edge node may collect telemetry from its local resources (e.g., at edge node 0 520) and from edge peers (e.g., at edge node 1 525, obtained via a P2P telemetry interface).

The acceleration framework considers local telemetry data in addition to edge telemetry data 530 and peer edge telemetry data 540, each tracking the respective acceleration resource available at that location (e.g., a FPGA, a CPU, etc.), the type of measurement, and the measurement values (e.g., indicated in local resource telemetry values 530, local to the edge node 0 520, or peer resource telemetry values, local to the edge node 1 525). With telemetry values and hints collected from among one or multiple locations, the end point device (edge device D 510) can adequately make an acceleration offloading decision with implemented decision logic 512 (e.g., implemented with hardware, instructions, etc.).

The edge acceleration framework, whether considering telemetry from a local device, peer device, on-premises servers, base stations, or core servers, can utilize the telemetry information and decision rules to identify a subjectively "best" acceleration target relative to optimizing KPIs. In an example, the KPIs to be optimized may include:
  Power measurements (e.g., watts)
  Network latency requirements (e.g., milliseconds)
  Bandwidth
  Throughput
  Response time
  Function acceleration benchmarks (e.g., for function type).

Other elements that may be considered when computing resource usage may include:
  Cost as a monetary function (e.g., the cost of hardware and power, to represent the pure cost of execution on a given hardware platform)
  Cost as a resource usage function (e.g., if the battery on the local device is low, then the monetary cost to execute locally has to be larger, because the battery needs to return to a recharged state)

The use of edge acceleration resources may, in some scenarios, provide significant resource savings on the local device (such as battery), or, in some situations, provide better response time. For example, an improved response time from the use of edge resources may occur if latency to the edge cloud, plus the time needed to use hardware available on the edge (that is sufficient enough), can outperform or equal the latency of executing the function locally—while satisfying the SLA/SLO.

In order to fully integrate an edge accelerator framework that considers the possibility of local execution, an orchestration SLA may require a local machine to securely participate as one of the possible hosting environments. Thus, in addition to cost KPI considerations, a security context may be considered for local versus edge acceleration execution. A security context may be relevant in a multi-tenant scenario where the tenant's local machine may be considered a better/preferred hosting location for some portion of the workload. Additionally, the edge hosting nodes may opt for less performant acceleration in order to ensure proper protection of the workload.

The level of security protections offered in the respective environments of local acceleration resources may be monitored and attested. For example, the accelerator may implement a hardware root of trust environment as defined by Trusted Computing Group (TCG) Device Identifier Composition Engine (DICE) or Open Compute Project (OCP) Cerberus specifications. As another example, the accelerator may implement a trusted execution environment such as a secure enclave (e.g., provided from an Intel® SGX implementation) that further establishes a trusted connection to acceleration hardware such as an FPGA, GPU or AI accelerators.

Acceleration environments may provide attestation as part of telemetry collection, so that security-relevant attributes (such as those listed above) are available in context of the telemetry gathered. TCG defines a DICE and TPM-based attestation infrastructure that may be used for this purpose. Additionally, acceleration environments may partition acceleration resources according to tenant-specific offloading. For example, an FPGA located on a base station that offloads video decoding functions may isolate the decode bitstreams allocated to a first tenant using hardware-root-of-trust mechanisms. A second tenant similarly may have its decoded bitstream isolated to a different region of the FPGA. The isolation strategy that is applied may be reported as part of attestation assertions collected by an orchestrator, user, other edge acceleration nodes or directories that maintain discoverable profiles for edge acceleration services.

User equipment that supports local acceleration also may contribute an acceleration provider profile. The profile may include a setting describing whether or not the local resources can be used for other tenants besides the user. Further, SLAs may reference the security related assertions in context of which functions are to be accelerated and at what cost (e.g., for a fee, or otherwise).

As a basic example, the local vs. remote decision (e.g., implemented with logic 512) may be determined based on timing (latency). For instance, consider a scenario where the device is deciding whether to locally execute a given function F(X) (such as in a scenario where the function is an object detection model, and the input (X) is an image). In this scenario, the edge device has two options: (1) execute the function with local acceleration resources; or (2) send F(X) to edge acceleration resources (in the edge cloud) and wait for the edge acceleration resource to return with the result. In terms of latency, local and remote acceleration execution involves the consideration of two timing functions (with T1 representing local execution, and T2 representing remote execution):

$$T1=\text{Execute}(F(X), \text{Local Resources})$$

$$T2=\text{SendToEdge}(F,X))+\text{ExecuteAtEdge}(F(X))+\text{GetFromEdge}(F(X)) \quad \text{EQUATION 1}$$

Variability and jitter may exist within evaluation of the ExecuteAtEdge and GetFromEdge timing functions. Likewise, the use of edge acceleration functions may be variable unless the "best" or most reliable acceleration resources in the edge cloud are identified and selected. Also, in some cases, traversing multiple hops from the device to the "best" acceleration hardware at an edge node is significantly challenging. As a result of these considerations, a detailed discovery and comparison of using edge acceleration resource(s) versus local acceleration resource(s) may assist with meeting SLA objectives and increasing predictability and system reliability.

Additionally, the evaluation of the function at the remote acceleration (computed with T2 above) can be expanded to consider cost constraints. For instance, each transport and compute (or other reservation or use of the resource) incurs a cost that can be tracked, either in monetary or performance costs. With consideration of cost constraints, the different times T computed for the cost of that resources can be normalized. Thus, the selection of local or remote acceleration resources can be used to optimize time with cost considerations.

The architecture, as illustrated in FIG. 5, depicts a uni-dimensional or fixed optimization problem. However, this architecture may be expanded by options where accelerators or compute elements can provide an estimation to actively execute different types of functions. Such functions may be provided as a proxy for identifying different type of functions (or, considered as benchmarks for different type of functions).

Figure 6:
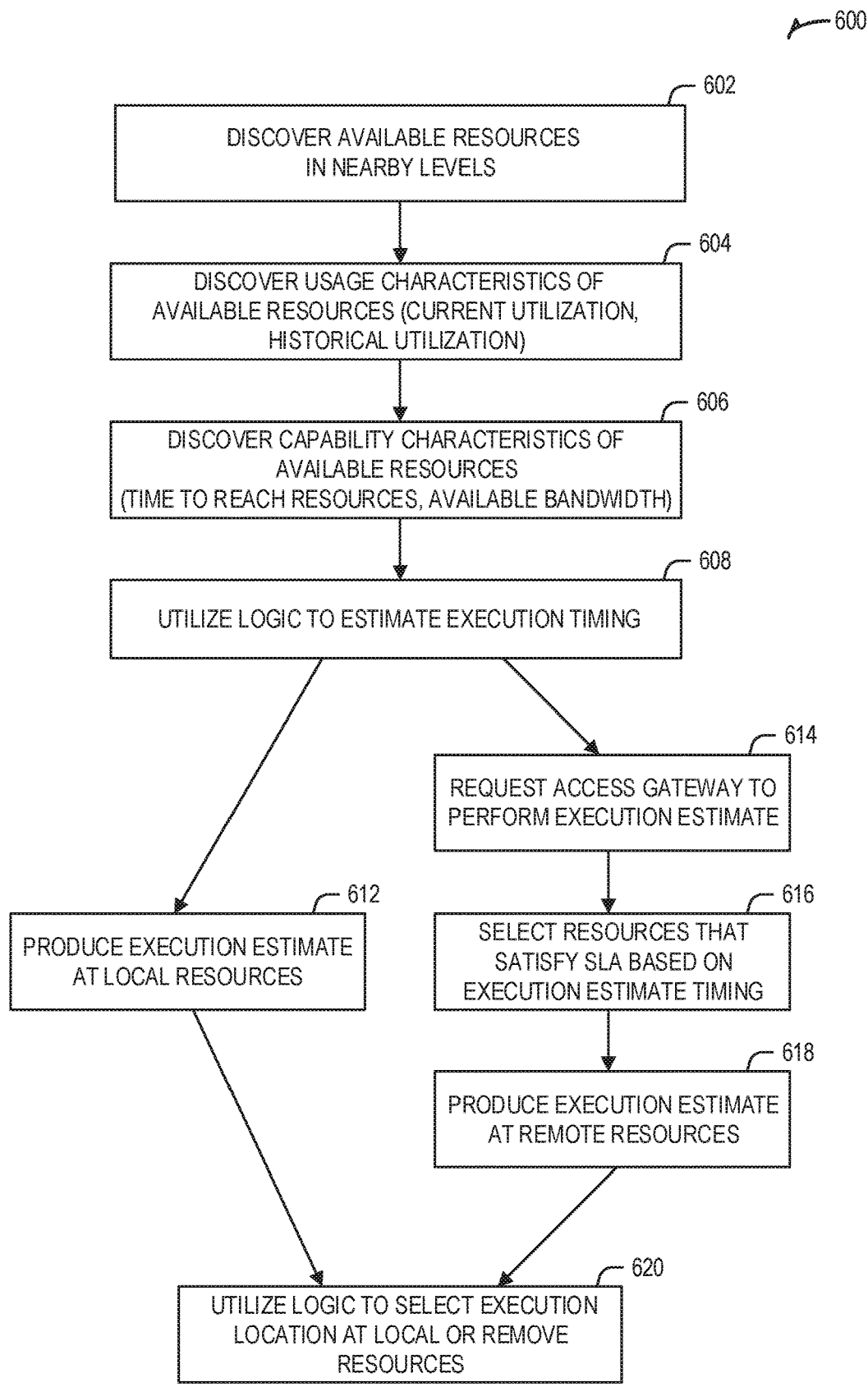
FIG. 6 illustrates a flowchart of an example method for discovery and evaluation of execution resources, according to an example.

FIG. 6 provides a flowchart of an example method 600 for discovery and evaluation of edge and local acceleration resources. Specifically, the following technique is provided to enable an edge device to discover and consider, using discrete units of time, execution timing from local and remote acceleration locations.

The first operation of method 600 includes a discovery of available resources in nearby levels of the edge computing system (e.g., peer nodes at the next level or levels of the edge environment), at operation 602. This is followed by a second discovery operation, at operation 604, to identify the usage characteristics of these available resources. This consideration of usage may include evaluating current utilization and potentially historical utilization for the last N units of time. This is followed by a third discovery operation, at operation 606, to identify the capability characteristics of these available resources (e.g., the time to reach the resource, available bandwidth, constraints, etc.).

The flowchart 600 then proceeds with the use of implemented logic (e.g., implemented at the edge device, whether an endpoint client device, orchestrator, edge gateway, or otherwise) to determine execution timing, at operation 608. This is conducted with two branches to identify local timing versus remote timing estimates. At operation 612, an execution estimate is produced for the use of local acceleration resources. At operations 614-618, an execution estimate is produced for the use of remote acceleration resources.

Either type of estimate may be produced with the use of a proxy function that simulates results for a particular type of function upon a sample or actual workload. For instance, a suitable proxy function may be an object detection function that can be invoked (from time to time), such as to estimate how long it would take to execute another function whom performance is proxied or estimated relative to the object detection.

In an example, logic to estimate timing at the remote acceleration resources may include:

At operation 614, request to the remote edge device (e.g., an access gateway in the base station) to estimate the time to execute F with the payload X, and estimate a response size within a given SLA and resource requirements.

At operation 616, the remote edge device (access gateway or other device) selects and evaluates the resources that satisfy the SLA, while taking into account: (a) Time to transfer X; (b) Time to compute F(X); and (c) Time to return.

At operation 618, the remote edge device produces and returns the execution time estimate, based on the considerations of the function and data, and other values. The cost to perform the transfer, execute the function, and return the result at the remote location may be evaluated in the context of the SLA sanctioned agreements.

At operation 620, based on the results of the local and remote estimates, the edge device decides whether to invoke the acceleration resources locally or at the remote location. In other examples, this decision (and the logic implementation) may be performed by an orchestrator, gateway, or other entity. As will be understood, this decision may be made dynamically and depending on current conditions and the type and current availability of resources invoked. Where some acceleration resources are local and some are remote, this might mean that the resource usage could be 70% local and 30% remote in one situation but 100% remote in another situation.

Figure 7:
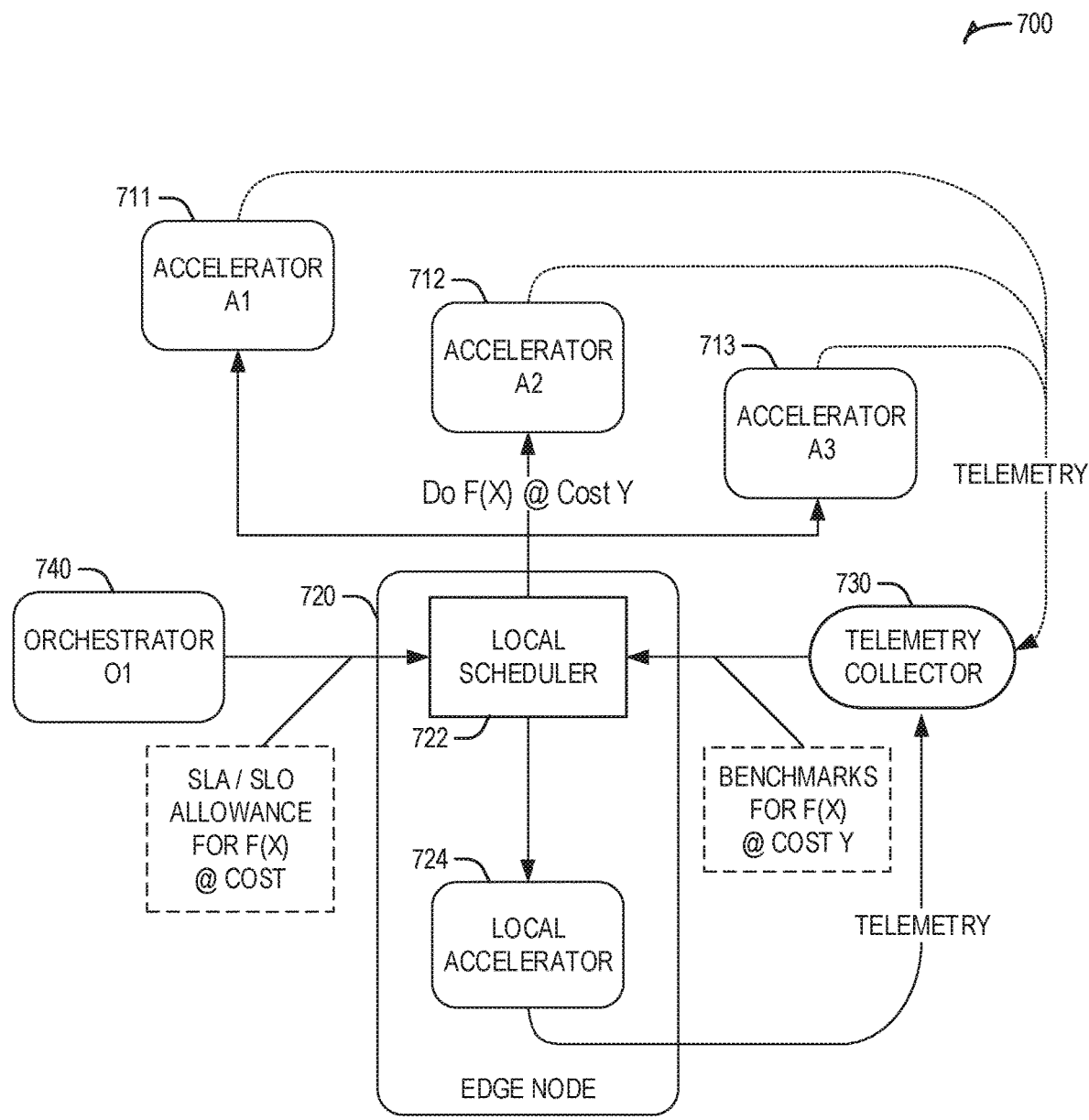
FIG. 7 illustrates an example data flow diagram for acceleration evaluation within an edge computing architecture, according to an example.

FIG. 7 provides an example data flow diagram for acceleration evaluation within an edge computing architecture 700, further to the architecture depicted in FIG. 5 and operations depicted in FIG. 6. In this diagram, the various resources of the architecture 700 are adapted for evaluation and use of a local accelerator 724 or one of three edge accelerators A1 711, A2 712, A3 713, as triggered by an edge node 720. This evaluation is performed based on the collection of telemetry from among the plurality of remote acceleration resources using a telemetry collector 730 (e.g., implemented by a gateway, orchestrator, or other entity).

As discussed above, the estimate and evaluation may be expanded by additional operations where accelerators or compute elements that can execute functions provide an estimation to execute actively different types of functions. These functions are used as a proxy for different type of functions (or used as benchmarks for different type of functions). For instance, one proxy function could be object detection. This proxy function can be used on an occasional or optional basis, to estimate how long it would take to execute a function whom performance can be proxy by an object detection. Even with the use of a proxy function, the cost to perform the transfer, execution, and return transfer can be evaluated in the context of the SLA considerations.

In a specific application of a proxy function, in the architecture of FIG. 7, the request to the respective accelerators 711, 712, 713, is provided via a request to an access gateway in the base station (not shown in FIG. 7). This request is used to request an estimate of the time to execute F with the payload X, plus an estimate response size within a given SLA and resource requirements. The access gateway (which can be a hardware- or software-based orchestrator plus scheduler) identifies which is the proxy or benchmark function that matches to F(X) per each of the available accelerators or compute nodes.

In a further example, the access gateway generates a matrix of estimate cost to execute F(X) plus the estimated time of transfer for T'(X) and T'(result(X)) in all the different available compute costs. This information is returned to the local scheduler 722 for consideration and evaluation.

The local scheduler 722 considers the SLA/SLO allowance for the function, relative to the estimated cost provided by the access gateway. If the cost of a resource exceeds what is authorized by SLA, then the resource receives score of (−1) throwing it out of scope for scheduling consideration. Other techniques for evaluating, excluding, and weighting scoring may also be used. Based on the results of scoring, the lowest cost resource wins and is selected for execution.

Figure 8:
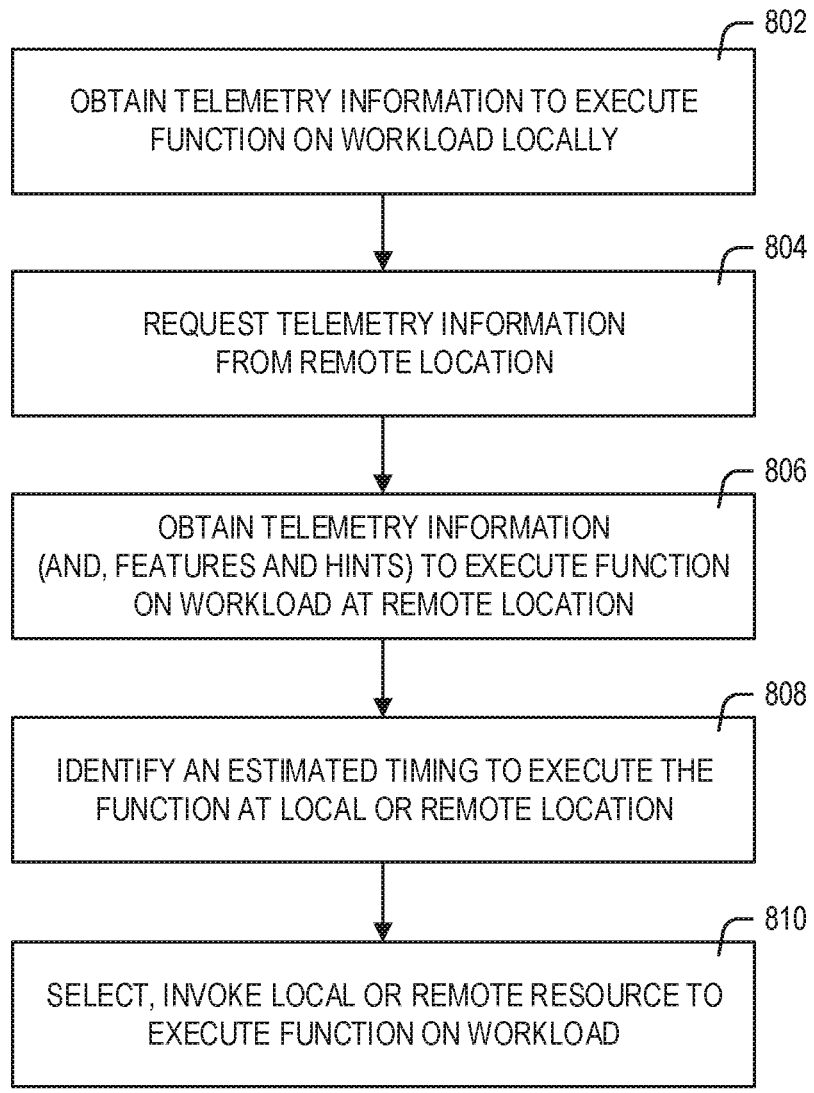
FIG. 8 illustrates a flowchart of an example method for managing acceleration execution in an edge computing system, according to an example.

FIG. 8 illustrates a flowchart 800 of an example method for managing acceleration execution in an edge computing system. This method may be performed by a client device edge node, a server or gateway edge node, an orchestrator, or other entities in or connected to an edge computing system, as suggested above.

At 802, operations are performed to obtain telemetry information to execute function on workload locally. This first telemetry information is accessed to obtain data that indicates availability of a local acceleration resource (such as acceleration circuitry of the computing device discussed above) to execute a function.

At 804, an optional operation is performed to request telemetry information from a remote location (a remote acceleration resource available to execute the function). In other examples, this telemetry information is provided or accessible without request.

At 806, an operation is performed to obtain telemetry information (and optionally, features and hints) to execute the function on the workload at remote location. This second telemetry information is accessed to obtain data that indicates availability of a remote acceleration resource to execute the function, for a remote acceleration resource located at a remote location in an edge computing system. In further examples, the second telemetry information includes an indication of the remote acceleration resource, a type of measurement for the remote acceleration resource, and a measurement value for the type of measurement.

At 808, an operation is performed to identify an estimated time to execute the function at the local or remote location, based on an evaluation of the first and second telemetry information. For instance, the estimated time to execute the function at the remote acceleration resource may be based on a time value or measurement to send the workload to the remote location, plus a time value or measurement to execute the function on the workload at the remote location, plus a time value or measurement to obtain results of the function from the remote location.

At 810, operations are performed to select, and as applicable, invoke a local or remote resource to execute a function on workload, based on identification of the estimated time in relation to a service level agreement. For instance, resource with a lower time estimate (optionally computed or normalized after a full consideration of costs) to perform the function may be selected or identified.

Figure 9:
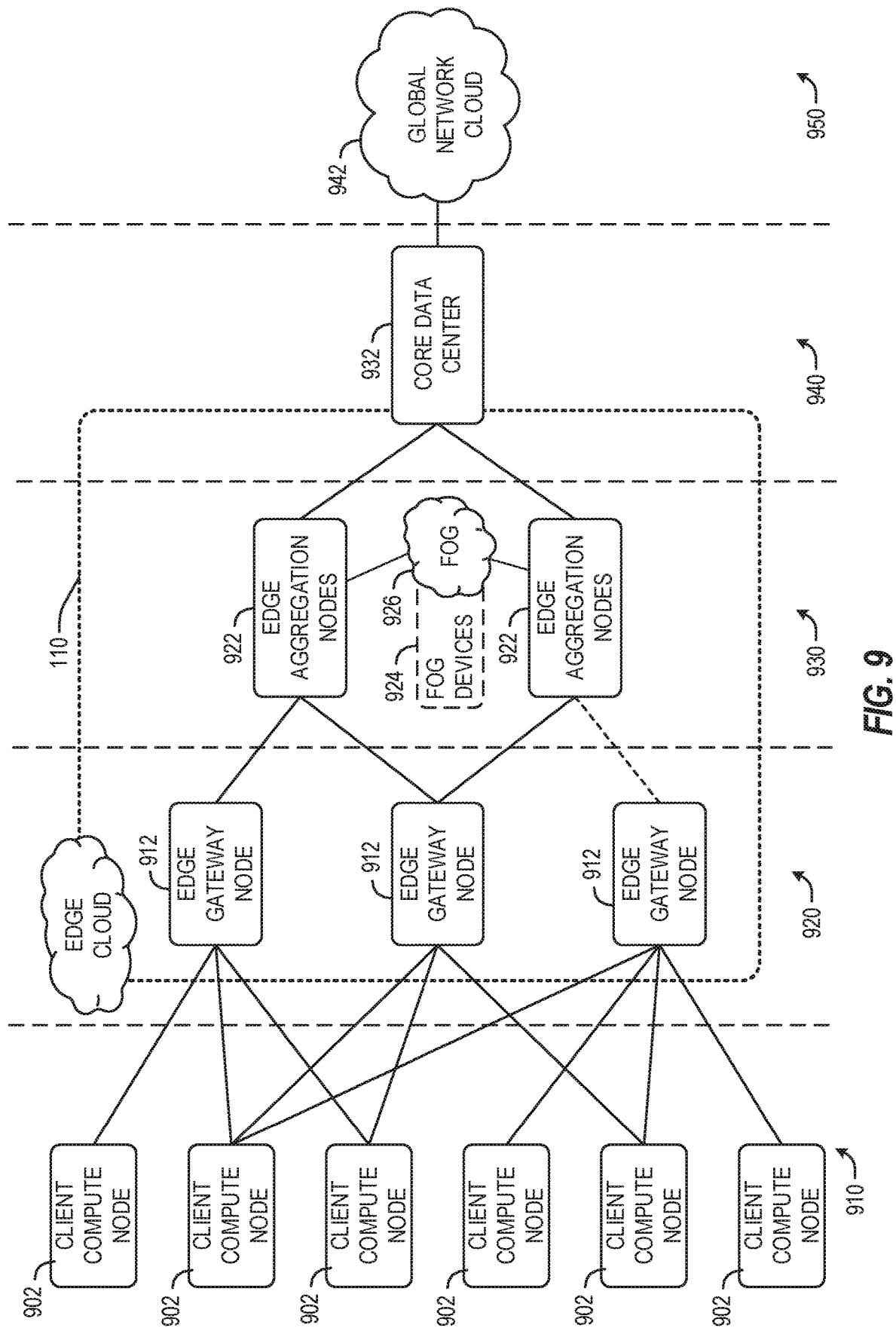
FIG. 9 provides an overview of layers of distributed compute deployed among an edge computing system, according to an example.

At a more generic level, an edge computing system may be described to encompass any number of deployments at the previously discussed layers operating in the edge cloud 110 (network layers 400-440), which provide coordination from client and distributed computing devices. FIG. 9 provides a further abstracted overview of layers of distributed compute deployed among an edge computing environment for purposes of illustration.

FIG. 9 generically depicts an edge computing system for providing edge services and applications to multi-stakeholder entities, as distributed among one or more client compute nodes 902, one or more edge gateway nodes 912, one or more edge aggregation nodes 922, one or more core data centers 932, and a global network cloud 942, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 910, 920, 930, 940, 950. For example, the client compute nodes 902 are each located at an endpoint layer 910, while each of the edge gateway nodes 912 are located at an edge devices layer 920 (local level) of the edge computing system. Additionally, each of the edge aggregation nodes 922 (and/or fog devices 924, if arranged or operated with or among a fog networking configuration 926) are located at a network access layer 930 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 932 is located at a core network layer 940 (a regional or geographically-central level), while the global network cloud 942 is located at a cloud data center layer 950 (a national or global layer). The use of "core" is provided as a term for a centralized network location— deeper in the network—which is accessible by multiple edge nodes or components; however, a "core" does not necessarily designate the "center" or the deepest location of the network. Accordingly, the core data center 932 may be located within, at, or near the edge cloud 110.

Although an illustrative number of client compute nodes 902, edge gateway nodes 912, edge aggregation nodes 922, core data centers 932, global network clouds 942 are shown in FIG. 9, it should be appreciated that the edge computing system may include more or fewer devices or systems at each layer. Additionally, as shown in FIG. 9, the number of components of each layer 910, 920, 930, 940, 950 generally increases at each lower level (i.e., when moving closer to endpoints). As such, one edge gateway node 912 may service multiple client compute nodes 902, and one edge aggregation node 922 may service multiple edge gateway nodes 912.

Consistent with the examples provided herein, each client compute node 902 may be embodied as any type of end point component, device, appliance, or "thing" capable of communicating as a producer or consumer of data. Further, the label "node" or "device" as used in the edge computing system 900 does not necessarily mean that such node or device operates in a client or slave role; rather, any of the nodes or devices in the edge computing system 900 refer to individual entities, nodes, or subsystems which include discrete or connected hardware or software configurations to facilitate or use the edge cloud 110.

As such, the edge cloud 110 is formed from network components and functional features operated by and within the edge gateway nodes 912 and the edge aggregation nodes 922 of layers 920, 930, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 9 as the client compute nodes 902. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 926 (e.g., a network of fog devices 924, not shown in detail), which may be embodied as a system-level horizontal and distributed architecture that distributes resources and services to perform a specific function. For instance, a coordinated and distributed network of fog devices 924 may perform computing, storage, control, or networking aspects in the context of an IoT system arrangement. Other networked, aggregated, and distributed functions may exist in the edge cloud 110 between the core data center layer 950 and the client endpoints (e.g., client compute nodes 902). Some of these are discussed in the following sections in the context of network functions or service virtualization, including the use of virtual edges and virtual services which are orchestrated for multiple stakeholders.

As discussed in more detail below, the edge gateway nodes 912 and the edge aggregation nodes 922 cooperate to provide various edge services and security to the client compute nodes 902. Furthermore, because each client compute node 902 may be stationary or mobile, each edge gateway node 912 may cooperate with other edge gateway devices to propagate presently provided edge services and security as the corresponding client compute node 902 moves about a region. To do so, each of the edge gateway nodes 912 and/or edge aggregation nodes 922 may support multiple tenancy and multiple stakeholder configurations, in which services from (or hosted for) multiple service providers and multiple consumers may be supported and coordinated across a single or multiple compute devices.

In further examples, any of the compute nodes or devices discussed with reference to the present edge computing systems and environment may be fulfilled based on the components depicted in FIGS. 10A and 10B. Each edge compute node may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 10A:
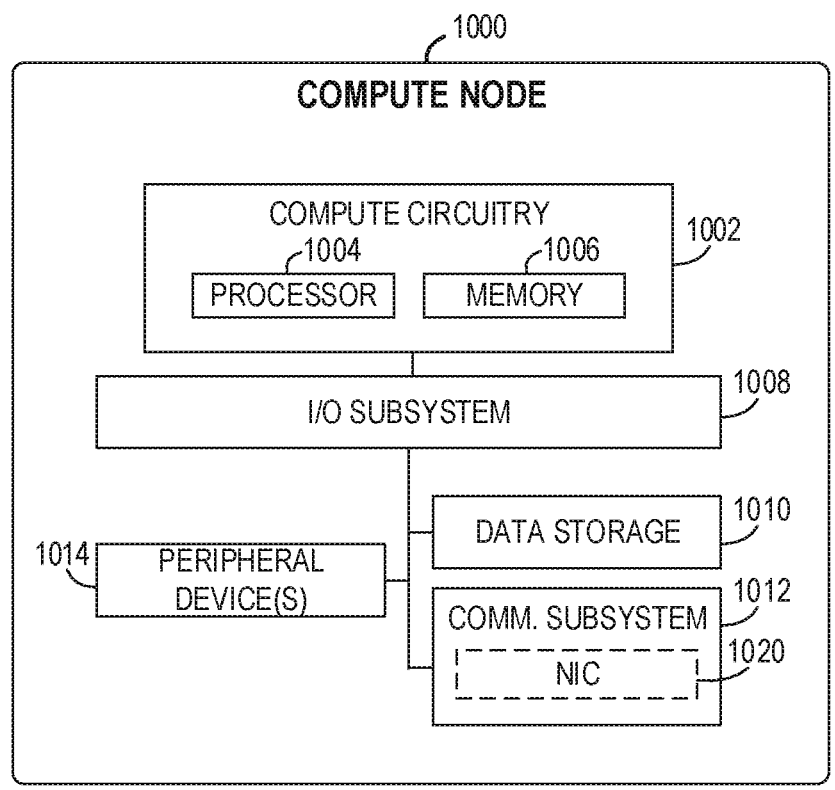
FIG. 10A provides an overview of example components for compute deployed at a compute node in an edge computing system, according to an example.

In the simplified example depicted in FIG. 10A, an edge compute node 1000 includes a compute engine (also referred to herein as "compute circuitry") 1002, an input/output (I/O) subsystem 1008, data storage 1010, a communication circuitry subsystem 1012, and, optionally, one or more peripheral devices 1014. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1000 may be embodied as any type of engine, device, or collection of devices capable of performing various compute functions. In some examples, the compute node 1000 may be embodied as a single device such as an integrated circuit, an embedded system, a field-programmable gate array (FPGA), a system-on-a-chip (SOC), or other integrated system or device. In the illustrative example, the compute node 1000 includes or is embodied as a processor 1004 and a memory 1006. The processor 1004 may be embodied as any type of processor capable of performing the functions described herein (e.g., executing an application). For example, the processor 1004 may be embodied as a multi-core processor(s), a microcontroller, or other processor or processing/controlling circuit. In some examples, the processor 1004 may be embodied as, include, or be coupled to an FPGA, an application specific integrated circuit (ASIC), reconfigurable hardware or hardware circuitry, or other specialized hardware to facilitate performance of the functions described herein.

The main memory 1006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 1006 may be integrated into the processor 1004. The main memory 1006 may store various software and data used during operation such as one or more applications, data operated on by the application(s), libraries, and drivers.

The compute circuitry 1002 is communicatively coupled to other components of the compute node 1000 via the I/O subsystem 1008, which may be embodied as circuitry and/or components to facilitate input/output operations with the compute circuitry 1002 (e.g., with the processor 1004 and/or the main memory 1006) and other components of the compute circuitry 1002. For example, the I/O subsystem 1008 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1008 may form a portion of a system-on-a-chip (SoC) and be incorporated, along with one or more of the processor 1004, the main memory 1006, and other components of the compute circuitry 1002, into the compute circuitry 1002.

The one or more illustrative data storage devices 1010 may be embodied as any type of devices configured for short-term or long-term storage of data such as, for example, memory devices and circuits, memory cards, hard disk drives, solid-state drives, or other data storage devices. Each data storage device 1010 may include a system partition that stores data and firmware code for the data storage device 1010. Each data storage device 1010 may also include one or more operating system partitions that store data files and executables for operating systems depending on, for example, the type of compute node 1000.

The communication circuitry 1012 may be embodied as any communication circuit, device, or collection thereof, capable of enabling communications over a network between the compute circuitry 1002 and another compute device (e.g., an edge gateway node 912 of the edge computing system 900). The communication circuitry 1012 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 1012 includes a network interface controller (NIC) 1020, which may also be referred to as a host fabric interface (HFI). The NIC 1020 may be embodied as one or more add-in-boards, daughter cards, network interface cards, controller chips, chipsets, or other devices that may be used by the compute node 1000 to connect with another compute device (e.g., an edge gateway node 912). In some examples, the NIC 1020 may be embodied as part of a system-on-a-chip (SoC) that includes one or more processors, or included on a multichip package that also contains one or more processors. In some examples, the NIC 1020 may include a local processor (not shown) and/or a local memory (not shown) that are both local to the NIC 1020. In such examples, the local processor of the NIC 1020 may be capable of performing one or more of the functions of the compute circuitry 1002 described herein. Additionally or alternatively, in such examples, the local memory of the NIC 1020 may be integrated into one or more components of the client compute node at the board level, socket level, chip level, and/or other levels.

Additionally, in some examples, each compute node 1000 may include one or more peripheral devices 1014. Such peripheral devices 1014 may include any type of peripheral device found in a compute device or server such as audio input devices, a display, other input/output devices, interface devices, and/or other peripheral devices, depending on the particular type of the compute node 1000. In further examples, the compute node 1000 may be embodied by a respective edge compute node in an edge computing system (e.g., client compute node 902, edge gateway node 912, edge aggregation node 922) or like forms of appliances, computers, subsystems, circuitry, or other components.

Figure 10B:
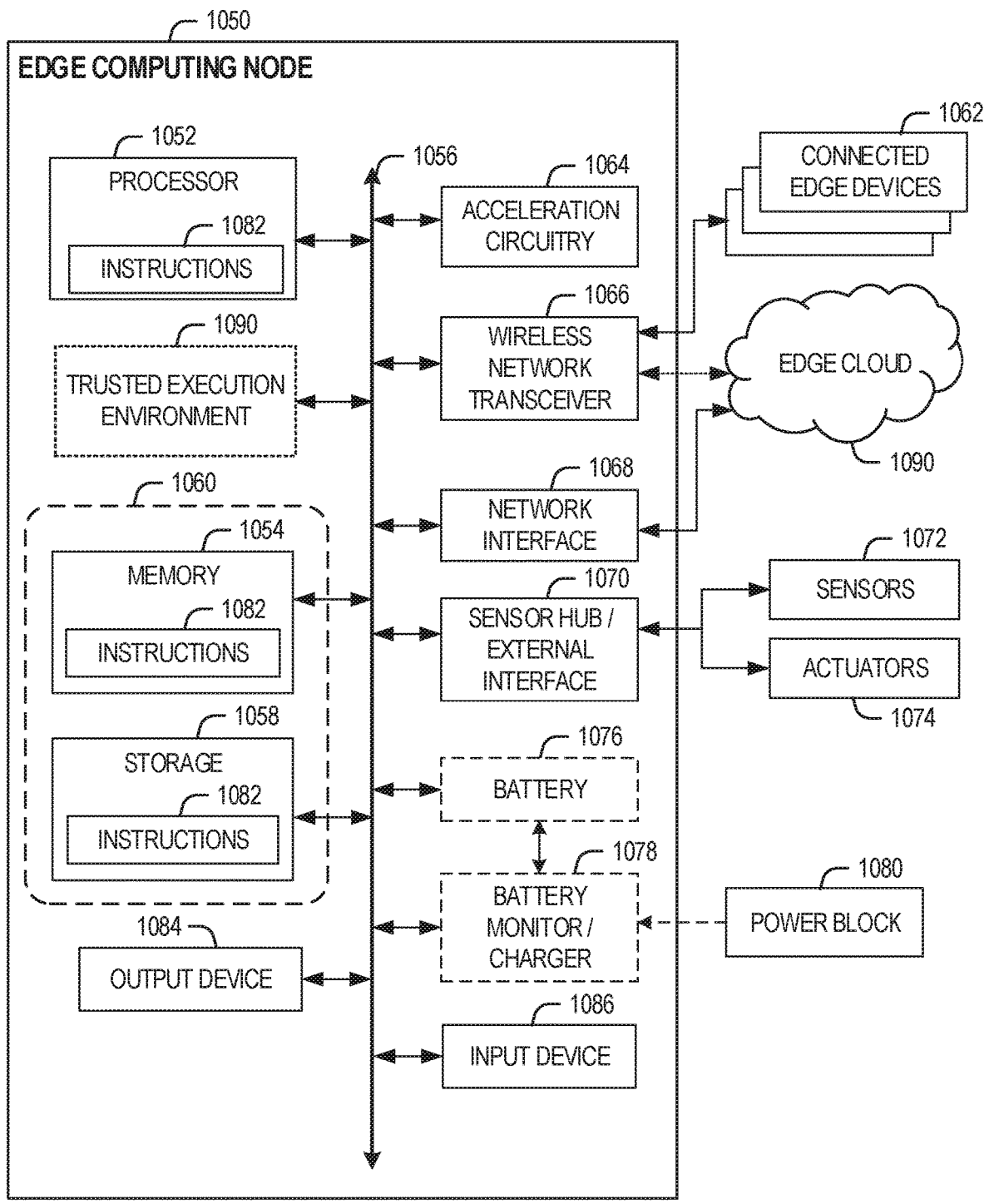
FIG. 10B provides a further overview of example components within a computing device in an edge computing system, according to an example.

In a more detailed example, FIG. 10B illustrates a block diagram of an example of components that may be present in an edge computing node 1050 for implementing the techniques (e.g., operations, processes, methods, and methodologies) described herein. The edge computing node 1050 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 1050, or as components otherwise incorporated within a chassis of a larger system.

The edge computing node 1050 may include processing circuitry in the form of a processor 1052, which may be a microprocessor, a multi-core processor, a multithreaded processor, an ultra-low voltage processor, an embedded processor, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, Calif. As an example, the processor 1052 may include an Intel® Architecture Core™ based processor, such as a Quark™, an Atom™, an i3, an i5, an i7, or an MCU-class processor, or another such processor available from Intel®. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an I2C interface, an SPI interface, point to point interfaces, and a power bus, among others.

The interconnect 1056 may couple the processor 1052 to a transceiver 1066, for communications with the connected edge devices 1062. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the edge computing node 1050 may communicate with close devices, e.g., within about 10 meters, using a local transceiver based on BLE, or another low power radio, to save power. More distant connected edge devices 1062, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1066 (e.g., a radio transceiver) may be included to communicate with devices or services in the edge cloud 1090 via local or wide area network protocols. The wireless network transceiver 1066 may be an LPWA transceiver that follows the IEEE 802.15.4, or IEEE 802.15.4g standards, among others. The edge computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1068 may be included to provide a wired communication to nodes of the edge cloud 1090 or to other devices, such as the connected edge devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1064, 1066, 1068, or 1070. Accordingly, in various examples, applicable means for communicating (e.g., receiving, transmitting, etc.) may be embodied by such communications circuitry.

The edge computing node 1050 may include or be coupled to acceleration circuitry 1064, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, a global positioning system (GPS) sensors, pressure sensors, barometric pressure sensors, and the like. The hub or interface 1070 further may be used to connect the edge computing node 1050 to actuators 1074, such as power switches, valve actuators, an audible sound generator, a visual warning device, and the like.

In some optional examples, various input/output (I/O) devices may be present within or connected to, the edge computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1050.

A battery 1076 may power the edge computing node 1050, although, in examples in which the edge computing node 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the edge computing node 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the edge computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the edge computing node 1050. A wireless battery charging circuit, such as an LTC4020 chip from Linear Technologies of Milpitas, Calif., among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine-readable medium 1060 including code to direct the processor 1052 to perform electronic operations in the edge computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as optical disks, flash drives, or any number of other hardware devices. The non-transitory, machine-readable medium 1060 may include instructions to direct the processor 1052 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 10A and 10B are intended to depict a high-level view of components of a device, subsystem, or arrangement of an edge computing node. However, it will be understood that some of the components shown may be omitted, additional components may be present, and a different arrangement of the components shown may occur in other implementations.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an edge computing device in an edge computing system, comprising: acceleration circuitry; processing circuitry; and a memory device comprising instructions stored thereon, wherein the instructions, when executed by the processing circuitry, configure the processing circuitry to perform operations to: obtain first telemetry information that indicates availability of the acceleration circuitry to execute a function; obtain second telemetry information that indicates availability of a remote acceleration resource to execute the function, the remote acceleration resource located at a remote location in the edge computing system that is remote from the edge computing device; identify an estimated time to execute the function at the acceleration circuitry or the remote acceleration resource, based on evaluation of the first and second telemetry information; and select use of the acceleration circuitry or the remote acceleration resource, to execute the function on a workload, based on identification of the estimated time to execute the function at the remote acceleration resource or the acceleration circuitry in relation to a service level agreement.

In Example 2, the subject matter of Example 1 includes, wherein the second telemetry information includes an indication of the remote acceleration resource, a type of measurement for the remote acceleration resource, and a measurement value for the type of measurement.

In Example 3, the subject matter of Example 2 includes, wherein the type of measurement relates to: resource utilization, resource availability, resource capabilities, performance measurements, power measurements, throughput, computational benchmarks, response time, monetary costs, resource usage costs, or latency.

In Example 4, the subject matter of Examples 2-3 includes, wherein the second telemetry information includes indications of a plurality of remote acceleration resources, wherein the type of measurement and the measurement value are provided for respective resources of the plurality of remote acceleration resources.

In Example 5, the subject matter of Example 4 includes, wherein the plurality of remote acceleration resources includes a first acceleration resource at the remote location and a second acceleration resource at a peer of the remote location.

In Example 6, the subject matter of Examples 1-5 includes, wherein the estimated time to execute the function at the remote acceleration resource is based on a time to send the workload to the remote location, a time to execute the function on the workload at the remote location, and a time to obtain results of the function from the remote location.

In Example 7, the subject matter of Examples 1-6 includes, wherein the use of the acceleration circuitry or the remote acceleration resource is further selected based on costs associated with a transport to the remote location and use of the acceleration resource at the remote location.

In Example 8, the subject matter of Examples 1-7 includes, the instructions further to perform operations to obtain features and hints of the remote acceleration resource for use of the remote acceleration resource at the remote location, wherein selecting use of the acceleration circuitry or the remote acceleration resource is further based on the features and hints obtained for the remote acceleration resource.

In Example 9, the subject matter of Examples 1-8 includes, the instructions further to perform operations to request, from the remote location, the second telemetry information, wherein the request communicates an identification of the function, a resource type, and requirements associated with the service level agreement.

In Example 10, the subject matter of Example 9 includes, wherein the availability of the remote acceleration resource to execute the function is determined by the remote location, based on an estimated time to execute the function at the remote location which meets the requirements associated with the service level agreement.

In Example 11, the subject matter of Examples 1-10 includes, wherein a proxy function is used to produce an estimated time to execute the function at the remote acceleration resource, and wherein the acceleration circuitry or the remote acceleration resource is invoked based on a lower estimated time.

In Example 12, the subject matter of Examples 1-11 includes, wherein the acceleration circuitry includes at least one of a: field-programmable gate array (FPGA), a graphics processing unit (GPU) hardware, central processing unit (CPU) hardware, or artificial intelligence (AI) processor hardware.

In Example 13, the subject matter of Examples 1-12 includes, wherein the remote location is a gateway, base station, or access point of the edge computing system, and wherein the edge computing device is a mobile computing device connected to the remote location via a wireless network.

Example 14 is a method performed by a computing device, comprising: accessing first telemetry information that indicates availability of a local acceleration resource of the computing device to execute a function; accessing second telemetry information that indicates availability of a remote acceleration resource to execute the function, the remote acceleration resource located at a remote location in an edge computing system; identify an estimated time to execute the function at the remote acceleration resource or the local acceleration resource, based on evaluation of the first and second telemetry information; and select use of the local acceleration resource or the remote acceleration resource, to execute the function on a workload, based on identification of the estimated time to execute the function at the remote acceleration resource or the local acceleration resource in relation to a service level agreement.

In Example 15, the subject matter of Example 14 includes, wherein the second telemetry information includes an indication of the remote acceleration resource, a type of measurement for the remote acceleration resource, and a measurement value for the type of measurement.

In Example 16, the subject matter of Example 15 includes, wherein the type of measurement relates to: resource utilization, resource availability, resource capabilities, performance measurements, power measurements, throughput, computational benchmarks, response time, monetary costs, resource usage costs, or latency.

In Example 17, the subject matter of Examples 15-16 includes, wherein the second telemetry information includes indications of a plurality of remote acceleration resources, wherein the type of measurement and the measurement value are provided for respective resources of the plurality of remote acceleration resources.

In Example 18, the subject matter of Example 17 includes, wherein the plurality of remote acceleration resources includes a first acceleration resource at the remote location and a second acceleration resource at a peer of the remote location.

In Example 19, the subject matter of Examples 14-18 includes, wherein the estimated time to execute the function at the remote acceleration resource is based on a time to send the workload to the remote location, a time to execute the function on the workload at the remote location, and a time to obtain results of the function from the remote location.

In Example 20, the subject matter of Examples 14-19 includes, wherein the use of the acceleration circuitry or the remote acceleration resource is further selected based on costs associated with a transport to the remote location and use of the acceleration resource at the remote location.

In Example 21, the subject matter of Examples 14-20 includes, accessing features and hints of the remote acceleration resource for use of the remote acceleration resource at the remote location, wherein selecting use of the local acceleration resource or the remote acceleration resource is further based on the features and hints obtained from the remote location.

In Example 22, the subject matter of Examples 14-21 includes, invoking the local acceleration resource or the remote acceleration resource, based on the invoked resource having a lower estimated time.

In Example 23, the subject matter of Examples 14-22 includes, requesting, from the remote location, the second telemetry information, wherein the request communicates an identification of the function, a resource type, and requirements associated with the service level agreement.

In Example 24, the subject matter of Example 23 includes, wherein the availability of the remote acceleration resource to execute the function is determined by the remote location, based on an estimated time to execute the function at the remote location which meets the requirements associated with the service level agreement.

In Example 25, the subject matter of Examples 14-24 includes, wherein the use of the local acceleration resource or the remote acceleration resource is further selected based on costs associated with a transport to the remote location and use of the acceleration resource at the remote location.

In Example 26, the subject matter of Examples 14-25 includes, wherein a proxy function is used to produce an estimated time to execute the function at the remote acceleration resource, and wherein the acceleration circuitry or the remote acceleration resource is invoked based on a lower estimated time.

In Example 27, the subject matter of Examples 14-26 includes, wherein the acceleration circuitry includes at least one of a: field-programmable gate array (FPGA), a graphics processing unit (GPU) hardware, central processing unit (CPU) hardware, or artificial intelligence (AI) processor hardware.

In Example 28, the subject matter of Examples 14-27 includes, wherein the remote location is a gateway, base station, or access point of the edge computing system, and wherein the edge computing device is a mobile computing device connected to the remote location via a wireless network.

Example 29 is at least one non-transitory machine-readable storage device comprising instructions stored thereupon, which when executed by a processing circuitry of a computing device, cause the processing circuitry to perform any of the operations of Examples 1 to 28.

Example 30 is an apparatus, comprising: accessing means to obtain first telemetry information that indicates availability of a local acceleration means of the computing device to execute a function; accessing means to obtain second telemetry information that indicates availability of a remote acceleration means to execute the function, the remote acceleration means located at a remote location in an edge computing system; computing means to identify an estimated time to execute the function at the remote acceleration means or the local acceleration means, based on evaluation of the first and second telemetry information; and selection means to identify the local acceleration means or the remote acceleration means to execute the function on a workload, based on identification of the estimated time to execute the function at the remote acceleration means or the local acceleration means in relation to a service level agreement.

In Example 31, the subject matter of Example 30 includes, wherein the second telemetry information includes an indication of the remote acceleration means, a type of measurement for the remote acceleration means, and a measurement value for the type of measurement.

In Example 32, the subject matter of Example 31 includes, wherein the type of measurement relates to: resource utilization, resource availability, resource capabilities, performance measurements, power measurements, throughput, computational benchmarks, response time, monetary costs, resource usage costs, or latency.

In Example 33, the subject matter of Examples 31-32 includes, wherein the second telemetry information includes indications of a plurality of remote acceleration means, wherein the type of measurement and the measurement value are provided for respective resources of the plurality of remote acceleration means.

In Example 34, the subject matter of Example 33 includes, wherein the plurality of remote acceleration means includes a first acceleration means at the remote location and a second acceleration means at a peer of the remote location.

In Example 35, the subject matter of Examples 30-34 includes, wherein the estimated time to execute the function at the remote acceleration means is based on a time to send the workload to the remote location, a time to execute the function on the workload at the remote location, and a time to obtain results of the function from the remote location.

In Example 36, the subject matter of Examples 30-35 includes, wherein the use of the acceleration circuitry or the remote acceleration means is further selected based on costs associated with a transport to the remote location and use of the acceleration means at the remote location.

In Example 37, the subject matter of Examples 30-36 includes, data processing means to process features and hints of the remote acceleration means for use of the remote acceleration means at the remote location, wherein selecting use of the local acceleration means or the remote acceleration means is further based on the features and hints obtained from the remote location.

In Example 38, the subject matter of Examples 30-37 includes, means for invoking the local acceleration means or the remote acceleration means, based on the invoked resource means having a lower estimated time.

In Example 39, the subject matter of Examples 30-38 includes, means for requesting, from the remote location, the second telemetry information, wherein the request communicates an identification of the function, a resource type, and requirements associated with the service level agreement.

In Example 40, the subject matter of Example 39 includes, wherein the availability of the remote acceleration means to execute the function is determined by the remote location, based on an estimated time to execute the function at the remote location which meets the requirements associated with the service level agreement.

In Example 41, the subject matter of Examples 30-40 includes, wherein the use of the local acceleration means or the remote acceleration means is further selected based on costs associated with a transport to the remote location and use of the acceleration means at the remote location.

In Example 42, the subject matter of Examples 30-41 includes, wherein a proxy function is used to produce an estimated time to execute the function at the remote acceleration means, and wherein the acceleration circuitry or the remote acceleration means is invoked based on a lower estimated time.

Example 43 is at least one machine-readable medium including instructions that, when executed by processing circuitry, cause the processing circuitry to perform operations to implement of any of Examples 1-42.

Example 44 is at least one machine-readable storage medium, comprising information representative of instructions that, when executed by processing circuitry, cause the processing circuitry to, perform the operations of any of Examples 1-42.

Example 45 may include one or more non-transitory computer-readable media comprising instructions to cause an electronic device, upon execution of the instructions by one or more processors of the electronic device, to perform one or more elements of a method described in or related to any of Examples 1-42, or any other method or process described herein.

Example 46 may include an apparatus comprising logic, modules, or circuitry to perform one or more elements of a method described in or related to any of Examples 1-42, or any other method or process described herein.

Example 47 may include a method, technique, or process as described in or related to any of Examples 1-42, or portions or parts thereof.

Example 48 may include an apparatus comprising: one or more processors and one or more computer readable media comprising instructions that, when executed by the one or more processors, cause the one or more processors to perform the method, techniques, or process as described in or related to any of Examples 1-42, or portions thereof Example 49 may include a signal as described in or related to any of examples 1-42, or portions or parts thereof.

Example 50 may include a signal in a wireless network as described in or related to any of Examples 1-42, or as otherwise shown and described herein.

Example 51 may include a method of performing or coordinating communications in a wireless network as described in or related to any of Examples 1-42, or as otherwise shown and described herein.

Example 52 may include a device for processing communication as described in or related to any of Examples 1-42, or as otherwise shown and described herein.

Example 53 is a network comprising respective devices and device communication mediums for performing any of the operations of Examples 1-42, or as otherwise shown and described herein.

Example 54 is an edge cloud computing device implementation comprising processing nodes and computing units adapted for performing any of the operations of Examples 1-42, or as otherwise shown and described herein.

Example 55 is an apparatus comprising means to implement of any of Examples 1-54.

Example 56 is a system to implement of any of Examples 1-54.

Example 57 is a method to implement of any of Examples 1-54.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A method performed by a computing system, comprising:
    obtaining first telemetry information that indicates availability of a local acceleration resource of the computing system to execute a function;
    obtaining second telemetry information that indicates availability of a remote acceleration resource to execute the function, the remote acceleration resource located at a remote location in an edge computing system;
    identifying an estimated time to complete execution of the function at the local acceleration resource and the remote acceleration resource, based on evaluation of the first and second telemetry information;
    identifying an urgency level for execution of the function; and
    in response to a determination that the remote acceleration resource is capable to execute a portion of the function and provide results based on the urgency level faster than the local acceleration resource, causing the remote acceleration resource to execute the portion of the function and causing the local acceleration resource to execute a remaining portion of the function.

2. The method of claim 1, further comprising:
    identifying a complexity level for execution of the function, wherein determining whether to execute the function at the local acceleration resource or the remote acceleration resource is based on identification of the estimated time to execute the function at the local acceleration resource and the remote acceleration resource in relation to the complexity level, and the urgency level.

3. The method of claim 2, wherein the urgency level is based on a response time of the local acceleration resource and the remote acceleration resource to execute the function, wherein the estimated time to complete execution of the function includes an amount of time required to transfer the function to the remote acceleration resource, and wherein to execute a portion of the function and provide results includes transferring data from the computing system to the remote acceleration resource and receiving a result from the remote acceleration resource at the computing system.

4. The method of claim 1, wherein the local acceleration resource implements a hardware root of trust environment and wherein the hardware root of trust environment is defined by Trusted Computing Group (TCG) Device Identifier Composition Engine (DICE) or Open Compute Project (OCP) Cerberus specifications.

5. The method of claim 2, wherein the local acceleration resource implements a trusted execution environment (TEE), and wherein the TEE establishes a trusted connection to hardware of the local acceleration resource.

6. The method of claim 1, further comprising:
    in response to a determination that the remote acceleration resource is capable to execute the entire function based on the urgency level faster than the local acceleration resource, causing the remote acceleration resource to execute the function;
    in response to a determination that the local acceleration resource is capable to execute the entire function based the urgency level faster than the remote acceleration resource, causing the local acceleration resource to execute the function; and
    in response to a determination that the remote acceleration resource is capable to execute at least a portion of the function faster than the local acceleration resource based on the urgency level, and a determination that the local acceleration resource is capable to execute the function at a required security level to be used when executing the function, causing the local acceleration resource to execute the function.

7. The method of claim 6, wherein the required security level to be used when executing the function is included in a service level agreement (SLA).

8. The method of claim 2, wherein the second telemetry information includes an indication of the remote acceleration resource, a type of measurement for the remote acceleration resource, and a measurement value for the type of measurement, and wherein the type of measurement relates to: resource utilization, resource availability, resource capabilities, performance measurements, power measurements, throughput, computational benchmarks, response time, monetary costs, resource usage costs, or latency.

9. An edge computing device in an edge computing system, comprising:
    acceleration circuitry;
    processing circuitry; and
    a memory device comprising instructions stored thereon, wherein the instructions, when executed by the processing circuitry, configure the processing circuitry to perform operations to:
        obtain first telemetry information that indicates availability of the acceleration circuitry to execute a function;
        obtain second telemetry information that indicates of a remote acceleration resource to execute the function, the remote acceleration resource located at a remote location in the edge computing system that is remote from the edge computing device;
        identify an estimated time to complete execution of the function at the acceleration circuitry and the remote acceleration resource, based on evaluation of the first and second telemetry information;
        identify an urgency level for execution of the function; and
        in response to a determination that the remote acceleration resource is capable to execute a portion of the function and provide results based on the urgency level faster than the acceleration circuitry, causing the remote acceleration resource to execute the portion of the function and causing the acceleration circuitry to execute a remaining portion of the function.

10. The edge computing device of claim 9, the operations further to:
    identify a complexity level for execution of the function, wherein determining whether to execute the function at the acceleration circuitry or the remote acceleration resource is based on identification of the estimated time to execute the function at the acceleration circuitry and the remote acceleration resource in relation to the complexity level and the urgency level, and wherein to execute a portion of the function and provide results includes transferring data from the edge computing system to the remote acceleration resource and receiving a result from the remote acceleration resource at the edge computing system.

11. The edge computing device of claim 9, wherein the urgency level is based on a response time of the acceleration circuitry and the remote acceleration resource to execute the function.

12. The edge computing device of claim 9, wherein the acceleration circuitry implements a hardware root of trust environment and wherein the hardware root of trust environment is defined by Trusted Computing Group (TCG) Device Identifier Composition Engine (DICE) or Open Compute Project (OCP) Cerberus specifications.

13. The edge computing device of claim 10, wherein the acceleration circuitry implements a trusted execution environment (TEE), and wherein the TEE establishes a trusted connection to hardware of the acceleration circuitry.

14. The edge computing device of claim 9, further comprising:
in response to a determination that the remote acceleration resource is capable to execute the entire function based on the urgency level faster than the acceleration circuitry, causing the remote acceleration resource to execute the function;
in response to a determination that the acceleration circuitry is capable to execute the entire function based on the urgency level faster than the remote acceleration resource, causing the acceleration circuitry to execute the function; and
in response to a determination that the remote acceleration resource is capable to execute at least a portion of the function faster than the acceleration circuitry based on the urgency level, and a determination that the acceleration circuitry is capable to execute the function at a required security level to be used when executing the function, causing the acceleration circuitry to execute the function.

15. The edge computing device of claim 10, wherein the second telemetry information includes an indication of the remote acceleration resource, a type of measurement for the remote acceleration resource, and a measurement value for the type of measurement, and wherein the type of measurement relates to:
resource utilization, resource availability, resource capabilities, performance measurements, power measurements, throughput, computational benchmarks, response time, monetary costs, resource usage costs, or latency.

16. The edge computing device of claim 14, wherein the required security level to be used when executing the function is included in a service level agreement (SLA).

17. At least one non-transitory machine-readable storage device comprising instructions stored thereupon, which when executed by a processing circuitry of a computing device, cause the processing circuitry to:
access first telemetry information that indicates availability of a local acceleration resource of the computing device to execute a function;
access second telemetry information that indicates availability of a remote acceleration resource to execute the function, the remote acceleration resource located at a remote location in an edge computing system;
identify an estimated time to complete execution of the function at the remote acceleration resource and the local acceleration resource, based on evaluation of the first and second telemetry information;
identify a complexity level for the function; and
in response to a determination that the remote acceleration resource is capable to execute a portion of the function and provide results based on the complexity level faster than the local acceleration resource, causing the remote acceleration resource to execute the portion of the function and causing the local acceleration resource to execute a remaining portion of the function.

18. The machine-readable storage device of claim 17, wherein the instructions further cause the processing circuitry to:
identify an urgency level for execution of the function and wherein determining whether to execute the function at the remote acceleration resource or the local acceleration resource is based on identification of the estimated time to execute the function at the local acceleration resource and the remote acceleration resource in relation to the urgency level and the complexity level, and wherein to execute a portion of the function and provide results includes transferring data from the computing device to the remote acceleration resource and receiving a result from the remote acceleration resource at the computing device.

19. The machine-readable storage device of claim 18, wherein the local acceleration resource implements a hardware root of trust environment.

20. The machine-readable storage device of claim 19, wherein the hardware root of trust environment is defined by Trusted Computing Group (TCG) Device Identifier Composition Engine (DICE) or Open Compute Project (OCP) Cerberus specifications.

21. The machine-readable storage device of claim 18, wherein the local acceleration resource implements a trusted execution environment (TEE), and wherein the TEE establishes a trusted connection to hardware of the local acceleration resource.

22. The machine-readable storage device of claim 17, wherein the instructions further cause the processing circuitry to:
in response to a determination that the remote acceleration resource is capable to execute the entire function based on the complexity level faster than the local acceleration resource, causing the remote acceleration resource to execute the function;
in response to a determination that the local acceleration resource is capable to execute the entire function based on the complexity level faster than the remote acceleration resource, causing the local acceleration resource to execute the function; and
in response to a determination that the remote acceleration resource is capable to execute at least a portion of the function faster than the local acceleration resource based on the complexity level, and a determination that the local acceleration resource is capable to execute the function at a required security level to be used when executing the function, causing the local acceleration resource to execute the function.

23. The machine-readable storage device of claim 18, wherein the second telemetry information includes an indication of the remote acceleration resource, a type of measurement for the remote acceleration resource, and a measurement value for the type of measurement, and wherein the type of measurement relates to: resource utilization, resource availability, resource capabilities, performance measurements, power measurements, throughput, computational benchmarks, response time, monetary costs, resource usage costs, or latency.

24. The machine-readable storage device of claim 22, wherein the required security level to be used when executing the function is included in a service level agreement (SLA).

\* \* \* \* \*